(12) United States Patent
Blad et al.

(10) Patent No.: US 10,443,860 B2
(45) Date of Patent: Oct. 15, 2019

(54) HYDRAULIC SYSTEM

(71) Applicant: Grundfos Holding A/S, Bjerringbro (DK)

(72) Inventors: Thomas Blad, Bjerringbro (DK); Christian Blad, Aalborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 77 days.

(21) Appl. No.: 15/538,491

(22) PCT Filed: Dec. 16, 2015

(86) PCT No.: PCT/EP2015/080013
§ 371 (c)(1),
(2) Date: Jun. 21, 2017

(87) PCT Pub. No.: WO2016/102271
PCT Pub. Date: Jun. 30, 2016

(65) Prior Publication Data
US 2017/0336081 A1    Nov. 23, 2017

(30) Foreign Application Priority Data
Dec. 22, 2014   (EP) ..................... 14199695

(51) Int. Cl.
*F24D 19/10* (2006.01)
*F04D 13/06* (2006.01)
*F04D 15/00* (2006.01)
*F24D 3/08* (2006.01)
*F04D 29/42* (2006.01)
*F16K 11/00* (2006.01)

(52) U.S. Cl.
CPC ......... *F24D 19/1012* (2013.01); *F04D 13/06* (2013.01); *F04D 13/0606* (2013.01);
(Continued)

(58) Field of Classification Search
CPC .... F24D 19/1012; F24D 19/1066; F24D 3/08; F04D 13/06; F04D 13/0606;
(Continued)

(56) References Cited

U.S. PATENT DOCUMENTS 2,607,535 A * 8/1952 Moore ................ F24D 19/1066
237/19
3,582,229 A   6/1971 von Fellenberg
(Continued)

FOREIGN PATENT DOCUMENTS

DE    19 42 647 A1    3/1970
DE    23 63 231 A1    7/1974
(Continued)

*Primary Examiner* — Gregory L Huson
*Assistant Examiner* — Daniel E Namay
(74) *Attorney, Agent, or Firm* — McGlew and Tuttle, P.C.

(57) ABSTRACT

A hydraulic system includes at least one circulation pump assembly (2) provided with a speed controller (26), at least one hydraulic circuit (A, B) connected to the circulation pump assembly (2) as well as at least one mechanical switch device (86, 88; 120, 122) which is mechanically subjected to pressure by a fluid in the hydraulic circuit (A, B) and which can be moved into at least two different switch positions. The mechanical switch device (86, 88; 120, 122) moves by the circulation pump assembly (2) hydraulic coupling via the fluid. The speed controller is configured to initiate a movement of the switch device (86, 88; 120, 122), by at least one hydraulic force acting upon the switch device (86, 88; 120, 122) and causing a movement of the switch device (86, 88; 120; 122) via the hydraulic circuit, via a speed adaptation of the circulation pump assembly (2).

27 Claims, 12 Drawing Sheets

(52) U.S. Cl.
CPC ..... *F04D 15/0005* (2013.01); *F04D 15/0022* (2013.01); *F04D 15/0066* (2013.01); *F04D 29/4293* (2013.01); *F16K 19/003* (2013.01); *F24D 3/08* (2013.01); *F24D 19/1066* (2013.01); *Y02B 30/745* (2013.01)

(58) Field of Classification Search
CPC ............... F04D 15/005; F04D 15/0066; F04D 29/4293; F16K 19/003; Y02B 30/745
USPC .............................................. 237/8 A, 63, 65
See application file for complete search history.

(56) References Cited

U.S. PATENT DOCUMENTS

| | | | | |
|---|---|---|---|---|
| 3,695,121 | A | * | 10/1972 | Corrigan ............... F15B 11/121 475/132 |
| 3,897,903 | A | | 8/1975 | Race |
| 2005/0180857 | A1 | * | 8/2005 | Marioni ............... F24D 19/0092 417/43 |
| 2015/0014425 | A1 | * | 1/2015 | Olesen ..................... F24D 3/08 237/8 C |
| 2015/0211528 | A1 | * | 7/2015 | Byskov Skafsgaard .................... F24D 3/105 417/26 |

FOREIGN PATENT DOCUMENTS

| | | |
|---|---|---|
| EP | 0 529 353 A1 | 3/1993 |
| EP | 0 569 713 A1 | 11/1993 |
| EP | 0 902 240 A2 | 3/1999 |
| EP | 2 708 825 A1 | 3/2014 |
| EP | 2 775 218 A2 | 9/2014 |
| FR | 2 655 599 A1 | 6/1991 |
| GB | 2 318 179 A | 4/1998 |

* cited by examiner

HYDRAULIC SYSTEM

CROSS REFERENCE TO RELATED APPLICATIONS

This application is a United States National Phase Application of International Application PCT/EP2015/080013 filed Dec. 16, 2015, and claims the benefit of priority under 35 U.S.C. § 119 of European Application 14199695.9 filed Dec. 22, 2014 the entire contents of which are incorporated herein by reference.

FIELD OF THE INVENTION

The invention relates to a hydraulic system.

BACKGROUND OF THE INVENTION

Hydraulic systems, in particular hydraulic circulation systems are known for example in the form of heating installations and/or air-conditioning installations, in which a fluid heat transfer medium, for example water, is delivered in a circuit. The hydraulic systems for this, as a rule comprise at least one circulation pump assembly which circulates the fluid in the system.

It is also known, to be able to arrange switch devices such as valves for example, in such hydraulic systems. Switch-over valves which permit the switch-over between two hydraulic circuits or two heating circuits are often to be found in heating installations for example. Thus, for example in a heating installation, a heated heat transfer medium can either be delivered through a room heating circuit or a heat exchanger for heating service water, depending on the switch position of such a valve. The switch-over valves which are necessary for this as a rule are electrically driven and activated. This means that electrical drives with necessary electrical connections are required.

SUMMARY OF THE INVENTION

It is an object of the present invention, to simplify a hydraulic system in a manner such that the number of necessary electrically actuated switch devices in the system can be reduced.

The hydraulic system according to the invention comprises at least one circulation pump assembly and at least one hydraulic circuit which is connected to this circulation pump assembly. Thereby, the hydraulic circuit is connected to the circulation pump assembly such that the circulation pump assembly circulates a fluid, such as water for example, in the hydraulic circuit. The hydraulic circuit thereby for example can be a heating installation or cooling installation, in which a fluid heat transfer medium, for example water, is delivered in the circuit. With regard to the circulation pump assembly, it is preferably the case of an electromotorically driven circulation pump assembly, e.g. a centrifugal pump assembly, in particular with a wet-running electric drive motor.

The circulation pump assembly according to the invention comprises a speed controller which permits the circulation pump assembly to be operated with at least two different speeds. Preferably, the circulation pump assembly can be set in its speed over a large range via the speed controller, i.e. the speed can be changed over a larger speed range in several steps or in an infinite manner.

Apart from the circulation pump assembly, according to the invention, at least one mechanical switch device is arranged in the hydraulic circuit and this switch device is subjected to the pressure of the fluid located in the hydraulic circuit or of the liquid located in the hydraulic circuit. The mechanical switch device can be moved into at least two different switch positions, i.e. at least into a first and into a second switch position.

According to the invention, one envisages making do without a separate, for example electric drive for the mechanical switch device, and instead, effecting the switch-over between the switch positions solely by way of the liquid or fluid which is located in the hydraulic circuit. This means that according to the invention, a force transmission is effected from the circulation pump assembly onto the mechanical switch device via the fluid located in the hydraulic circuit. This means that the at least one mechanical switch device is hydraulically coupled, preferably exclusively hydraulically coupled, to the circulation pump assembly via the fluid in the hydraulic circuit. Thereby, preferably no further mechanical coupling is provided between the circulation pump assembly and the switch device. In particular, no coupling is provided between the rotor or the impeller of the circulation pump assembly and the switch device via a mechanical engagement of these components. This means that preferably an exclusively hydraulic coupling via the fluid is envisaged.

The hydraulic coupling, via the speed controller, permits the adaption of the speed of the circulation pump assembly, i.e. permits the change of the speed given the same rotation direction, and moreover the actuation of the switch device, via the speed controller. For this, a suitable hydraulic force is produced via the speed adaptation of the circulation pump assembly via the at least one hydraulic circuit, and this force via the hydraulic circuit acts upon the switch device and causes the movement of the switch device. This one can make do without a separate drive of the switch device. The switch device in contrast can be moved preferably solely by hydraulic forces which are transmitted via the hydraulic circuit. These hydraulic forces can be produced in a targeted manner by way of speed adaptation or by way of the control of the speed of the circulation pump assembly by the speed controller. Here, the rotation direction of the circulation pump assembly is retained. Preferably, these are speed changes or speed adaptations which do not occur on normal operation of the hydraulic system, for example of a heating installation, or do not compromise this normal operation. The normal operation of the hydraulic system is thus not compromised by the switching of the mechanical switch device.

The mechanical switch device is preferably designed in a manner such that it reacts to pressure changes due to a speed change of the circulation pump assembly, in a manner such that the mechanical switch device is movable in dependence on the pressure or a change of the pressure, selectively into one of the switch positions. Thus for example it is possible for the switch device to be designed such that it moves into one of the two switch positions only on reaching a certain limit pressure. Thus one can succeed in the switch device e.g. being moved into a second switch position by way of increasing the pressure in the hydraulic system to or beyond this limit pressure. Thereby, the hydraulic system is preferably designed such that this limit pressure is not reached in the first switch position with normal operation, so that this first switch position can be safely retained in this operating condition. In a heating system for example, it is possible for service water heating to produce a higher pressure than is necessary for normal operation of the heating installation for heating a building. Thus the switch device, by way of increasing the pressure beyond a predefined limit value, can be moved into the second switch position which for example can be used to heat service water via the installation, as it is described hereinafter.

Alternatively, it is also possible not to design the switch device with regard to its switching function in a manner dependent on the absolute value of the pressure, but to design it such that it reacts to certain changes of the pressure, so that a switch-over from one switch position into the other can be achieved by way of targeted pressure changes. Thus in particular the switch device with regard to its switch function can be dependent on the speed of the pressure change so that it is designed for example such that with a rapid pressure change, it moves into a first switch position and with a slow pressure change into a second switch position.

According to the invention, one preferably envisages designing the switch device in a manner such that it reacts to differences in the course of a pressure build-up or pressure reduction of the fluid, given a speed change of the circulation pump assembly, in order to initiate a movement between the two different switch positions. This means that according to the invention, a combination of a circulation pump assembly and a mechanical switch device is provided, which utilizes a variability of the circulation pump assembly which has not been used until now, for moving the switch device. Whereas the speed of the circulation pump assembly which is to be reached on operation as a rule is determined and set by the desired flow or differential pressure in the hydraulic circuit, the running-up behavior and the braking behavior of the circulation pump assembly in previous hydraulic systems, such as heating systems, as a rule has no influence on the actual operation of the system. Inasmuch as this is concerned, one preferably envisages the starting-up behavior or braking behavior or the type or the course of a speed change of the circulation pump assembly, by way of variation, being used to move the switch device into a desired switch position via the hydraulic coupling. This means that the circulation pump assembly and the switch device are preferably designed such that the switch device is not moved into a desired switch position in dependence on the absolute pressure or end pressure which is to be achieved and/or on the end flow which is to be achieved, in the hydraulic circuit, but solely in dependence on the course of a pressure build-up or of a pressure reduction in the hydraulic circuit in dependence of a course of a speed change of the circulation pump assembly. For this, the switch device is preferably designed such that with a speed change (i.e. a speed increase or speed reduction) of the circulation pump assembly with a first course of the pressure build-up, it moves into a first switch position, and with a speed change of the circulation pump assembly with a second course of the pressure build-up which is different to this first course it moves into a second switch position. The drive of the circulation pump assembly is preferably activated via the speed controller in a different manner, in order to achieve the different courses of the pressure build-up. This means that no separate electric drive device for the switch device is necessary, and the single electrical component to be electrically activated is preferably the drive motor of the at least one circulation pump assembly. This drive motor, by way of a suitable setting of the course of a speed change via the speed controller, from which a different course of the pressure build-up or pressure reduction results, can simultaneously be used to actuate the switch device which is designed in a correspondingly matching manner.

Particularly preferably, the mechanical switch device is designed in a self-holding manner, such that it remains in the assumed switch position, up to a predefined speed or speed change of the circulation pump assembly. Thus the circulation pump assembly after reaching the desired switch position in particular can be controlled or regulated in the conventional manner, e.g. in order to set a desired differential pressure via the circulation pump assembly and/or the desired flow in the hydraulic circuit. This regulation (closed-loop control) then has no influence at all on the selected switch position. This means that the pump assembly on operation is self-holding up to a defined speed or speed change which is to effect a change of the switch position of the switch device. This speed change is preferably a speed change in the form of an acceleration, which is to say an increase of the speed from standstill of the pump assembly or departing from a basis speed. Alternatively, the speed change however can also be a speed reduction. The circulation pump assembly and the switch device are particularly preferably designed such that the speed of the circulation pump assembly is firstly reduced to such a basis speed or until standstill and then departing from the standstill or the basis speed a desired course of the speed increase and thus a correspondingly desired course of the pressure build-up is selected which is suitable for moving the switch device into a desired one of the possible switch positions or holding it in a desired switch position, for switching between the first and the second switch position of the switch device.

The speed controller is preferably designed in a manner such that with the help of this or by way of it, at least two different speed courses of the circulation pump assembly can be set, wherein the speed controller is further preferably designed in a manner such that the circulation pump assembly permits speed changes with at least two different acceleration courses. Thus the circulation pump assembly for example can be a circulation pump assembly with a drive motor which is closed-loop controlled in its speed, in particular with the help of a frequency converter. The speed controller thus can preferably be designed such that it can infinitely vary the speed. Alternatively, the speed controller however can also be designed such that it can set at least two different predefined speeds or several predefined speeds. The speed courses in particular can be ramps on starting up or braking the circulation pump assembly, which are preferably set differently steeply by the speed controller, wherein the switch device is then preferably designed such that with a slow speed change, it assumes a first switch position and with a rapid speed change with a steeper ramp, it assumes a second switch position. The slow speed change effects a slow pressure build-up or pressure reduction in the hydraulic circuit, and in contrast the rapid speed change effects a rapid pressure build-up or pressure reduction in the hydraulic circuit. The differently quick pressure build-up or pressure reduction is transferred onto the switch device which is designed such that it can react to the speed of the pressure build-up or reduction. The pressure build-up thereby can be effected in a continuous or constant manner, in particular with a speed increase. Alternatively, a stepwise speed change and thus a stepwise change, in particular increase of the pressure is possible as a speed course. Thereby, a slow pressure increase or pressure reduction for example can be designed such that it is effected in several steps or several stages, whereas the rapid pressure increase or reduction is effected in a direct manner. Pauses which are longer than with the rapid pressure increase or reduction could also be taken between the stages or steps for the slower pressure increase. It is to be understood that preferably the same end pressure as an operating pressure in the hydraulic circuit is always achieved with the different courses of the pressure build-up or pressure reduction, so that after actuating the switch device, the operation subsequent to this can be effected in the conventional manner without interference.

The speed controller can be part of a super-ordinate control device or one comprising further functions, which for example carries out a pressure and/or flow closed-loop control of the circulation pump assembly. This control device can additionally control the switching-over of the mechanical switch device. Alternatively, a separate control device coupled to the speed controller can also be provided for this.

The switch device is preferably designed such that the movements into the at least two different switch positions are effected with different temporal delays, wherein preferably the movements are effected along differently long paths and/or against differently great damping, inertia forces and/or biasing forces. The movements into the different switch positions are thus preferably effected with different dynamics. The temporal delays by way of the differently rapid pressure build-up or pressure reduction in the hydraulic system permit the switch device to be initiated into assuming or retaining a desired one of the possible switch positions. If the pressure for example is rapidly increased, the switch device can carry out a movement into a switch position which is subjected to a lesser delay or damping. A second, more greatly delayed movement, by way of the rapid pressure build-up due to the delay or damping is prevented or slowed down such that that switch position which requires a less delayed movement to be assumed, is reached more quickly. If however the pressure for example is increased more slowly, the delay can be compensated by the slow pressure increase, so that the switch device for example can be held in a switch position or moved into a switch position, in which the greater delay or damping acts. The differently rapid pressure build-up or pressure reduction for example can be effected in a continuous manner with a different gradient or however also in a stepwise manner, e.g. with differently long pauses between the steps or stages.

A desired delay can be achieved in different manner, for example by way of differently long paths of the switch device having to be covered for the individual switch positions. Alternatively or additionally, damping elements can be applied and/or friction forces, inertia forces or biasing forces can counteract the movement for its delay. The switch device can also be designed such that the gravity counteracts a movement into the different switch positions, to a differently great extent. The switch device can be designed in a targeted manner such that a higher damping or delay occurs in at least one movement direction into a first of the switch positions, than in a movement direction into a second switch position. Thereby, it is to be understood that a movement into one of the switch positions in the context of the invention can also mean that the switch device remains in this switch position if it was already previously located in this switch position.

According to a further preferred embodiment of the hydraulic system, the circulation pump assembly is connected to at least two hydraulic circuits, and the mechanical switch device is subjected to fluid pressure via at least one of the hydraulic circuits, in a manner such that the switch device can be moved by way of the forces produced by the fluid pressure. This means that the switch device is preferably subjected to the hydraulic pressure which is produced by the circulation pump assembly, wherein the switch device is designed such that it reacts to the different course of the pressure build-up resulting with a speed change of the circulation pump assembly, in particular with a speed increase as has been described previously, so that it can be moved into a desired switch position in dependence on the type of the course of the pressure build-up. The switch device for example can be arranged such that it is subjected to pressure via the first hydraulic circuit and effects a switching function in the second hydraulic circuit. However, with this function too, the switching-over or the movement of the switch device into the desired switch position is preferably not dependent on the absolute head of a reached pressure, but dependent on the type of pressure course in the hydraulic circuit connecting the circulation pump assembly to the switch device. Particularly preferably, both hydraulic circuits can be connected to the switch device and further preferably also both hydraulic circuits can be connected to the circulation pump assembly, wherein the pump assembly simultaneously causes a fluid flow in both hydraulic circuits, or causes a fluid flow in each case in one of the hydraulic circuits in a selective manner, which is to say in a preferably switchable manner.

Particularly preferably, the circulation pump assembly is connected to at least two hydraulic circuits, and the at least one mechanical switch device is designed as at least one valve with at least one movable valve element for changing the ratio of the flows through the at least two hydraulic circuits and in particular for switching-over a flow path between the at least two hydraulic circuits. Thus the two hydraulic circuits for example can be two circuits of a heating installation, for example a first circuit through a heat exchanger for heating service water, and a second circuit as a heating circuit in a building. The switch device can accordingly be designed as a valve, in particular a switch-over valve, in order to selectively lead the flow produced by the circulation pump assembly, into one of the hydraulic circuits. Thus preferably at least two switch positions of the mechanical switch device are provided, wherein the fluid flow through the first hydraulic circuit is effected in a first switch position, and through the second hydraulic circuit in a second switch position. The switching-over is preferably effected in dependence on the course of the pressure build up or pressure reduction with a speed change, in particular on accelerating or starting up the circulation pump assembly from standstill or departing from a basis speed.

Further preferably, the at least one valve comprises at least one first and a second control surface, upon which a fluid pressure produced by the circulation pump assembly acts, wherein the control surfaces are connected to the at least one valve element in a manner such that the valve element is movable by way of the forces acting on the first and the second control surface. The two control surfaces on the valve element for example can be arranged in opposite directions, which for example means arranged away from one another, so that the valve element can be moved in opposite directions depending upon which of the control surfaces a greater pressure acts. A relocation of the valve element in a desired direction can be achieved by way of a differently rapid pressure build-up, if a suitable delay is then effected in one of the movement directions. The flow path to one of the control surfaces can be designed such that a delayed pressure build-up occurs on the control surface, instead of delaying or braking the valve element in its movement in one direction. This, for example, can be achieved by way of suitable throttle locations, flow resistances and/or for example by way of different lengths of the flow paths which lead to the two control surfaces.

Particularly preferably, the at least one valve comprises at least two valve elements, wherein the first control surface is connected to the first valve element and the second control surface is connected to the second valve element. The control surfaces can thereby be arranged on the valve elements for example such that a fluid pressure acting on the control surfaces produces a pressure force acting in the opening direction of the valve elements, so that the valve elements can be pressed into an opened position by way of a suitably high fluid pressure. A reverse arrangement is alternatively possible, with which fluid pressure acting upon the control surfaces produces a pressure force acting in the closure direction of the valve elements, so that the valve elements can be pressed into a closed position by way of a suitably high fluid pressure. The two valve elements preferably have different dynamic characteristics, which for example can be achieved for example by a different damping, delay or inertia forces directed counter to the movement, as has been described beforehand. The valve elements react differently to different dynamics of the pressure build-up or pressure reduction, in particular to differently rapid pressure changes in the system, on account of the different dynamic characteristics. As described beforehand, the two valve elements are thereby preferably designed such that they move with a differently large delay and/or move counter to differently large biasing forces. Thus one can succeed in one of the valve elements being selectively moved first of all, by way of the different speed of a pressure change.

The control surfaces can be formed directly on an associated valve element, in particular formed on the valve element as one piece, said valve element causing the closure of a flow path. However, it is also possible for the control surfaces to be designed on a separate component which is connected in a suitable manner to an associated valve element or is coupled to this, for movement and force transmission.

The switch device according to a further preferred embodiment is situated at the entry side of the hydraulic circuits. Thus the switch device for example at the entry side of the hydraulic circuits can serve for selectively guiding a flow into one of the hydraulic circuits. The arrangement at the entry side of the hydraulic circuits has the advantage that a higher fluid pressure, namely the entry-side fluid pressure which is not yet reduced due to pressure losses in the hydraulic circuits, acts upon the switch device at this location. Thus, preferably a greater fluid pressure is available for moving the switch device into a desired switch position.

Further preferably, the switch device is arranged at the delivery side of the circulation pump assembly. This means that the switch device in the flow path between the delivery side and the suction side of the circulation pump assembly is situated closer to the delivery side of the circulation pump assembly than to the suction side. This means that a pressure loss between the switch device and the circulation pump assembly situated downstream is greater than the pressure loss between the exit side of the circulation pump assembly and the switch device. The mechanical switch device is particularly preferably arranged directly on or behind the delivery side of the circulation pump assembly, so that essentially no pressure loss occurs between the delivery side of the circulation pump assembly and the switch device. This means that here only a negligible pressure loss occurs in comparison to the pressure loss occurring in the remaining hydraulic circuit. Particularly preferably, the switch device can be integrated into a pump casing, directly at the delivery side of the circulation pump assembly.

Alternatively, it is also possible to arrange the mechanical switch device at the suction side of the circulation pump assembly. This means that with this embodiment, the mechanical switch device is situated closer to the suction side of the circulation pump assembly than to the delivery side. This means that preferably a pressure loss between the delivery side of the circulation pump assembly and the mechanical switch device, in a hydraulic circuit between the delivery side and the suction side of the circulation pump assembly, is greater than between the mechanical switch device and the suction side of the circulation pump assembly. The arrangement of the switch device at the suction side has the advantage that different hydraulic characteristics of the hydraulic circuits connecting the delivery side of the circulation pump assembly to the switch device can be utilized for the movement of the switch device. Thus for example one of the hydraulic circuits can be longer and/or have a greater flow resistance, so that a delayed pressure build-up at the switch device occurs via this hydraulic circuit. The arrangement at the suction side of the circulation pump assembly, which is to say preferably at the exit side of the mentioned hydraulic circuits also permits a switch-over between the hydraulic circuits, depending on which of the hydraulic circuits is opened to the suction side of the circulation pump assembly by the switch device.

The arrangement of the switch device at the suction side or delivery side of the circulation pump assembly can moreover be dependent on spatial or geometric designs of the hydraulic system or of the pipe conduits forming the hydraulic system.

According to a further preferred embodiment, the mechanical switch device is situated downstream of a first heat exchanger in the hydraulic system. Such a first heat exchanger in the hydraulic system leads to a pressure loss between the circulation pump assembly and the mechanical switch device. Such a first heat exchanger, which is to say a primary heat exchanger, in a heating or cooling system for example can serve for the temperature control of a heat transfer medium which circulates in the hydraulic system. Thus the first heat exchanger can be situated in a boiler or in a heat storage means or for example be formed by a solar collector or cooling assembly.

The switch device is moreover preferably additionally affected by gravity, at least one magnet force and/or at least one spring force, which acts in the direction of at least one movement axis, i.e. a movement direction of the switch device. The valve elements for example in one movement direction can be subjected to a biasing force which can be formed by gravity and/or by a magnet force and/or by a spring force, in the case that the switch device is designed as a valve with one or more valve elements. In the case of a valve, the valve element for example can be impinged by such a biasing force in the closure direction. However, a reverse design is also possible, in which the biasing force impinges the valve element in the opening direction. Such a biasing force can serve for holding the switch device and in particular a valve element of the switch device in a desired idle position when the circulation pump assembly is not in operation or for example runs with a basis speed which is reduced with respect to normal operation. It is thus ensured that the switch device or its valve elements always assume a defined starting position or a defined idle position. The switch device can then be moved out of this idle position into a desired switch position by way of the selection of the course of the pressure build-up, by way of a suitable speed control of the circulation pump assembly. The switch device for example with a first course of the pressure build-up can remain in its first switch position which corresponds to the idle position and with a second course of the pressure build-up which is different can be moved into a second switch position.

The described biasing force which is to say e.g. the gravity force and/or the at least one magnet force and/or spring force is preferably directed opposite to a hydraulic force which acts on the switch device and is produced by the circulation pump assembly. Thus the switch device, in particular a valve element of the switch device, can be held in a defined starting or idle position for example by way of gravitational force, magnet force and/or spring force and be moved counter to the biasing force by way of a suitable pressure build-up which creates a hydraulic force on a control surface of the switch device. The hydraulic force is thereby produced by the circulation pump assembly via the delivered fluid.

According to a particularly preferred embodiment, the switch device comprises at least two valve elements as has been described beforehand, wherein in the idle position each valve element is held in a first switch position by way of a biasing force, such as gravitational force, and/or magnet force and/or spring force, and the valve elements as well as the gravity force, magnet force and/or spring force are designed such that one of the valve elements is firstly moved into a second switch position by way of the fluid pressure, in dependence on the course of the speed change of the circulation pump assembly. The first switch position can be a closed or an opened switch position, depending on the design. Accordingly, the second position is an opened or closed switch position. The idle position is then preferably assumed by the valve element when the circulation pump assembly is switched off and or rotates with a basis speed which is lower than the normal operational speed. This idle position is then defined and held by the occurring mentioned biasing force. The closed switch position of the valve element is thereby achieved by way of the valve element bearing on a corresponding valve seat. Thereby, a sealed contact can be envisaged, by way of which the valve is completely closed. However, a contact with a predefined minimal opening can also be provided, so that the flow path through the valve element is not completely closed in the closed switch position, but is only reduced to a minimum. The valve element is moved via the fluid pressure in dependence on the speed set by the speed controller or on the course of the speed change which is set by the speed controller. The valve element is thereby moved into an opened or into a closed switch position, depending on the design of the switch device, so that the cross section of the flow path between the valve element and the associated valve seat is enlarged or reduced. Differently high rotation speeds or differently rapid courses of the speed changes can be selected for example, in order to be able to move one of the valve elements into one of the switch positions in a targeted manner. Thus for example a first valve element can be moved into a first switch position given a slower course of the speed change, whereas a second valve element can be moved into the first switch position given a quicker course of the speed change, wherein the respective other valve element remains in its second switch position.

Further preferably, the first and the second valve element in their movement direction between the switch positions have a differently large travels, are damped to a different extent and/or have differently large inertia forces, friction forces and/or biasing forces which are opposite to this movement direction. A differently large travel of the valve elements in particular means the travel which the valve element must cover between its closed and its opened position or vice versa. Further preferably, this travel is that path which the valve element must cover, until, as described further below, the other valve element is blocked. One can succeed in one of the valve elements reacting, i.e. opening or closing, more quickly to pressure changes than the other, due to the differently large travels and/or differently large damping or braking forces such as inertia forces, friction forces and/or biasing forces which are counter to the movement. Thus one of the valve elements can be moved in a targeted manner into a first switch position in dependence on the speed of the pressure build-up or pressure reduction. The first switch position can be an opened or a closed switch position of the valve element, depending on the design. It is also possible to delay the pressure build-up or pressure reduction on the control surface of the respective valve element instead of damping the valve element itself or of delaying it in its movement into its first switch position. This can be achieved for example by way of throttle elements in the flow path or by way of differently long or differently designed flow paths between the circulation pump assembly and the valve elements. This one can succeed in a pressure departing from the circulation pump assembly propagating differently rapidly to the valve elements by way of the targeted different design of the flow paths between the circulation pump assembly and the valve elements.

According to a particular embodiment of the invention, at least one of the valve elements can be provided with a delay device, wherein the delay device is designed in a manner such that fluid which flows through the valve along this valve element effects the delay. This means that the valve element is designed such that it is delayed in its movement into the opened switch position by way of hydraulic forces which are caused by the fluid itself, which flows through the valve. This has the advantage that one can make do without additional delay and damping means which could be prone to error. Hydraulic forces acting in a delaying manner can be achieved by way of a suitable leading of the flow paths. There exits the advantage that the fluid itself flushes the respective flow paths, since the fluid flowing through the valve produces these forces, so that a dirtying with the malfunctioning entailed by this can be avoided.

The delay device for example can thus have a valve gap which extends transversely to the movement axis of the valve element, between the valve element and a corresponding valve seat and which can preferably be changed in its gap width by way of a movement of the valve element along the movement axis. Forces acting upon the valve element can occur in such a valve gap when being subjected to through-flow and these forces counteract hydraulic forces acting upon a control surface of the valve element in a first movement direction. These forces can change, in particular reduce with a movement of the valve element due to a change of the gap width, so that they do not essentially counter the movement of the valve elements but only delay this. This means that the delay or damping forces preferably reduce with the movement of the valve element, and this can be effected for example by way of an enlargement of the valve gap extending transversely to the movement axis. The first movement direction can thereby preferably be the opening direction of the valve.

According to a particular embodiment of the invention, the valve can be designed such that the valve gap is closed in one switch position. This does not need to be the closed switch position of the valve or valve element, but rather the valve gap can close during the movement and then also open again at a later stage as the case may be. Targeted delay or damping forces can therefore be generated.

A valve with one of the valve elements for example can be designed such that the valve element departing from a first switch position firstly closes by a certain amount and subsequently opens further, with the movement of this valve element along its movement axis. The first switch position thereby can be the closed switch position, whereas the second switch position is the opened switch position. A valve gap can be formed in the valve element, as has been previously described. Increasing damping or delay forces on movement of the valve element can thus be produced if this valve gap firstly closes by a certain amount on movement of the valve element. However, if these forces are lower than the hydraulic forces which are produced by the fluid pressure on the control surface of the valve element, the valve element is moved further and opens further, wherein the valve gap for example can enlarge again, so that the damping or delay forces then reduce, so that these no longer counteract a reaching of the second switch position, i.e. for example a complete opening of the valve or the valve element.

According to a particularly preferred embodiment of the invention, the first and the second valve element are coupled in a manner such that always only one valve element can be located in its opened switch position or always only one valve element can be located in its closed position. This means that the valve elements are preferably arranged and designed such that they mutually block one another in their movement. The valve elements preferably comprise guide pins, whose movement paths intersect one another, so that when a guide pin of one valve element is located in the movement path of the guide pin of the other valve element, this other valve element is prevented from moving. The guide pins further preferably serve for the linear guiding of the valve elements along the predefined movement paths. If a valve element firstly moves into a second switch position for example by way of a rapid pressure build-up, one succeeds in a second valve element which is delayed in its movement subsequently likewise still being able to move into its second switch position, on account of the coupling or the mutual blocking. The first switch position can be an opened switch position and the second switch position can be a closed switch position or however the first switch position can be a closed switch position and the second switch position can be an opened switch position, depending on the design. A delay of the movement of a valve element can be effected for example also by way of a longer path which this valve element must cover, until it blocks the other valve element in its movement.

Particularly preferably, a first valve element is biased with a lower biasing force in its first movement direction than the second valve element. The first valve element is simultaneously preferably designed such that it is moved in a delayed manner compared to the second valve element, with a pressure build-up. With a slow pressure build-up, one succeeds in this delay being able to be compensated and the first valve element firstly moving counter to the biasing force into a second e.g. opened switch position on account of the weaker biasing force, with this design. If the fluid pressure then increases further, in particular increases to the extent that the biasing force of the second valve element is also overcome, then this can no longer move into its second switch position due to the coupling or block by the first valve element. If conversely however a rapid pressure build-up, up to a fluid pressure overcoming the biasing force of the second valve element, is effected, then one can prevent the first element moving so far that it blocks the second valve element before the second valve element is in its second switch position, due to the delay of the movement of the first valve element. This means that the second valve element moves so rapidly into its second position, that it is quicker in the second switch position than the first valve element. If the second valve element however is in its second switch position, then via the coupling it preferably blocks the first valve element in a manner such that this can no longer move into its second switch position.

At least one of the two valve elements is preferably designed such that it can move by a certain amount in the direction of its movement axis, without changing the switch condition of the valve, i.e. without opening the valve. According to a first preferred embodiment, the valve element biased to a greater extent is designed in this manner. However, the valve element which is biased to a lesser extent can alternatively or additionally also be designed in this manner. The more greatly biased valve is thereby preferably that valve which is situated in that hydraulic circuit of a heating installation, in which a secondary heat exchanger for heating service water is arranged. The more weakly biased valve in the case of a hydraulic circuit of a heating installation is preferably that valve which is situated in the hydraulic circuit forming a heating circuit for a building. The possibility of the movement of the valve element without opening the valve has the advantage that on coupling the valve elements, the valve element can move by an amount which is sufficient to block the other valve element in its movement, before the first, i.e. the valve element moving first of all, reaches its second switch position.

According to a further preferred embodiment, the hydraulic system is designed such that the flow of the circulation pump assembly is detected at least in certain operating conditions. The flow can be detected by a flow sensor or preferably by way of electrical variables of the circulation pump assembly by a suitable control device. The flow is preferably detected during the speed change and thus the pressure change for actuating the switch device. If no flow is ascertained for example in a first switch position, in which the heating circuit of a building is supplied with heating medium in a heating system, then this is an indication that there is no thermal demand in the heating circuit. This can be the case for example if all thermostat valves are closed in the heating circuit. The control device is preferably designed such that it does not increase the speed via the speed controller any further when no flow is detected. Such a further speed increase would unnecessarily increase the energy consumption. The control device can preferably also be designed such that it detects the valve position of the switch device by way of the flow.

Further preferably, the movement axes or movement directions of the first and second valve element are angled to one another, particularly preferably at right angles to one another, wherein the movement axes preferably intersect. A very simple blocking or coupling of the two valve elements in the previously described manner can be achieved by way of this. A blocking for example can be effected by way of a valve element moving into the movement path along the movement axis of the other valve element and thus blocking the further movement of the other valve element. Particularly preferably, as previously described, guide pins of the two valve elements can extend along movement paths which are angled to one another or intersect each other, in order to achieve a mutual blocking of the valve elements, so that it is always only one valve element which can be in a second switch position. Thereby, the second switch position can be an opened or a closed switch position, depending on the design.

The hydraulic system according to the invention is particularly preferably designed as a hydraulic heating system and/or cooling system, wherein preferably of the at least two hydraulic circuits, a first hydraulic circuit runs through the object to be temperature-controlled and a second hydraulic circuit runs through a secondary heat exchanger for the temperature control of the service water.

The object to be temperature-controlled for example can be a building, and the first hydraulic circuit runs through one or more radiators or floor heating circuits of the building. A primary heat exchanger, through which the fluid is first delivered, in order to control it with regard to temperature, which is to say heat it or cool it, can be situated upstream of both hydraulic circuits. The described mechanical switch device is preferably switched such that the fluid is delivered from the circulation pump assembly through the second hydraulic circuit running through the described secondary heat exchanger, if service water is to be heated or cooled. If a temperature control of service water is not desired, then the mechanical switch device is brought into its other switch position, in which the fluid is delivered by the circulation pump assembly through the first hydraulic circuit which runs through the object to be temperature controlled.

Such a design in particular is suitable with compact heating installations as are used for apartments and smaller buildings. With this installations, it is advantageous that one can make do without an additional drive for the switch device due to the switch device according to the invention which is actuated exclusively by way of variation of the speed or the speed course of the pump assembly, by which means the manufacturing costs for such a heating installation are reduced, and the failure risk is reduced.

Particularly preferably, the switch device comprises a first valve element in the mentioned first hydraulic circuit running through the object/building to be temperature-controlled, and a second valve element in the second hydraulic circuit running through the secondary heat exchanger, wherein the first valve element in the first movement direction is biased with a lesser force than the second valve element, and the first valve element in the second opposite movement direction in its movement is damped or delayed to a greater extent than the second valve element. The first movement direction can be the closure direction or the opening direction of the valve element, depending on the design. The second movement direction is then always the opposite movement direction. One can succeed in the second valve element being firstly moved into its second switch position with a slower speed change of the circulation pump assembly and a slower course of the pressure build-up or pressure reduction which is entailed by this, whereas the first valve element is firstly moved into its second switch position by way of a quicker course of the speed change or a quicker course of the pressure build-up or pressure reduction, with this design. Preferably, the two valve elements, as previously described, are thereby coupled to one another such that if one of the valve elements is in its second switch position, the other valve element can no longer move into its second switch position. The speed change can thereby be effected linearly or in a constant manner or also in steps or stages, as the case may be with differently long pauses between the steps, as has been described previously.

Further preferably, the circulation pump assembly and the at least one switch device are arranged in a common construction unit, in particular an integrated hydraulic construction unit for a compact heating installation. The subject matter of this invention is therefore also such a construction unit, in particular a construction unit for a compact heating installation, which comprises a circulation pump assembly and the at least one switch device. Thereby, the circulation pump assembly and the switch device preferably comprise at least one common housing part. It is to be understood that this construction unit can be realized together with one or more of the previously described features, in particular with features of the switch device.

The arrangement in a construction unit means that the switch device and the circulation pump assembly are arranged in the constructional vicinity of one another. The integrated hydraulic construction unit for a compact heating installation usually comprises the circulation pump assembly as well as the necessary valves and sensors and is further preferably connected directly to a secondary heat exchanger. Thus in a heating installation it only needs to be connected via external pipework to a primary heat exchanger, a service water feed, a service water discharge and the connections of an external heating circuit. It thus forms the central hydraulic constituent of the heating installation. The integrated hydraulic construction unit is preferably formed from one or more components, in which the necessary flow paths between the switch device, the circulation pump assembly and the mentioned secondary heat exchanger are situated. Preferably, the components of the integrated hydraulic construction unit are manufactured as injection molded parts of plastic.

The switch device particularly preferably lies directly on the circulation pump assembly and is preferably integrated into a pump casing of the circulation pump assembly. Thus, the switch device can for example be arranged in the suction chamber of the pump casing, preferably behind or directly adjacently at a partition wall separating the suction chamber from the pressure chamber of the pump casing. A particularly compact construction is therefore achieved. The switch device can alternatively also be integrated into the pump casing at the delivery side.

The switch device preferably comprises three hydraulic connections, wherein a first hydraulic connection is connected directly to the suction side or the delivery side of the circulation pump assembly, a second hydraulic connection is connected to a hydraulic circuit running through a secondary heat exchanger and a third connection is connected to a hydraulic circuit which runs through an object to be temperature-controlled. It is particularly with an integrated, hydraulic construction unit that the connections are thereby preferably situated such that the second hydraulic connection is arranged at an angle, in particular at right angles, to the third hydraulic connection. The third hydraulic connection thereby further preferably extends vertically downwards in the installed condition of the construction unit, whereas the second hydraulic connection extends horizontally. This is advantageous, since a secondary heat exchanger which for example can be designed as a plate heat exchanger, as a rule is situated at the rear side of the hydraulic construction unit in heating installations, whereas the external connections for connection of the hydraulic circuit running to an object to be temperature-controlled, as well as the further external connections, for example service water feed and service water discharge, as a rule extend vertically downwards. Thus the connections of the switch device can be connected directly to the necessary connections of the hydraulic construction unit or form these. The angled arrangement of the connections moreover favors the angled arrangement of the valve elements situated on the connections, in the manner described above, by way of which valve elements the coupling or the mutual movement blocking can be achieved.

According to a further particular embodiment of the invention, a valve element of the switch device in the first hydraulic circuit has a perpendicular movement axis, and a valve element in the second hydraulic circuit has a horizontal movement axis, wherein the horizontal movement axis preferably extends parallel to a rotation axis of the circulation pump assembly. This arrangement favors the integration into an integrated hydraulic construction unit of a compact heating installation, since the special arrangement of the connections as has been described previously and which corresponds to the common arrangement of the connections on such a construction unit, results by way of this arrangement. The rotation axis of the pump assembly with such construction units as a rule is directed such that it extends normally to the extension of a secondary heat exchanger, in particular parallel to the entries and exits of such a secondary heat exchanger.

The invention is hereinafter described by way of example and by way of the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
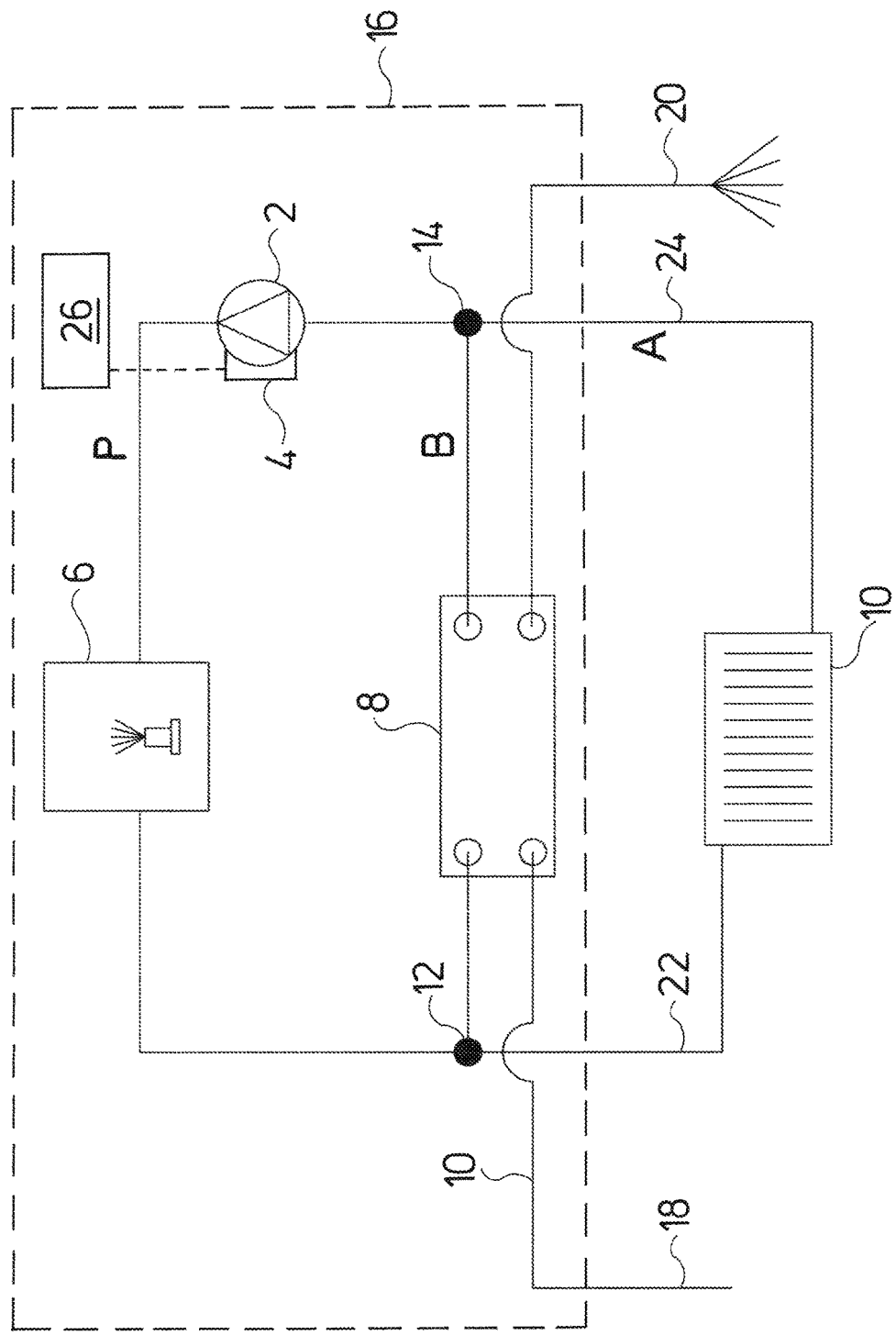
FIG. 1 is a schematic view of a hydraulic system according to the invention.

Referring to the drawings, FIG. 1 shows a heating installation as an example for a hydraulic system according to the invention. This heating installation uses a fluid heat transfer medium, in particular water, which is delivered in the circuit through the hydraulic system. The hydraulic system for this comprises a circulation pump assembly 2. The circulation pump assembly can be designed in a conventional manner, which is to say can comprise at least one impeller driven by an electric motor which is preferably designed as a canned motor, which is to say as a wet-running electrical drive motor. Further preferably, an electronic control is arranged directly on the circulation pump assembly or is integrated into the circulation pump assembly, by way of which control the pump assembly can be closed-loop controlled in its speed. The electronic control for this, in particular can comprise a frequency converter. The electronic control is particularly preferably arranged in an electronics housing or terminal box 4 which forms part of the circulation pump assembly 2 which means in particular is arranged directly on the motor housing or stator housing.

The hydraulic system moreover comprises a primary heat exchanger 6 which is arranged downstream of the circulation pump assembly 2. Here, the primary heat exchanger 6 is shown as a heating boiler. However, it is to be understood that the primary heat exchanger 6 for example can also be a cooling assembly or another heat source or cold source. The hydraulic system moreover comprises a secondary heat exchanger 8 which serves for the temperature control (here for heating) of service water. The secondary heat exchanger 8 for this comprises two flow paths, wherein the heating circuit running through the circulation pump assembly 2 and the primary heat exchanger 6 runs through a first flow path, and a service water conduit for the service water to be heated runs through a second flow path. This flow path of the heating circuit through the secondary heat exchanger 8 forms a second hydraulic circuit B, whereas a first hydraulic circuit A as a room heating circuit leads through one or more radiators 10 of a building to be heated or temperature-controlled. It is to be understood that also other suitable heat exchangers, for example also one or more circuits of a floor heating could be applied as a heating body or radiator 10. The first hydraulic circuit A and the second hydraulic circuit B via the circulation pump assembly 2 and the primary heat exchanger 6 in each case form closed hydraulic circuits, in which the heat-transfer medium is circulated.

At the entry side, the hydraulic circuits A and B branch way from one another at a branching point 12 and at the exit side are connected to one another again at the second branching point 14. A switch device in the form of a switch-over valve which selectively opens one of the flow paths through one of the hydraulic circuits A and B and closes the flow path through the respective other hydraulic circuit is arranged at the branching point 12 or the branching point 14, in order to lead the flow of the heat transfer medium which is produced by the circulation pump assembly 2, through the hydraulic circuit at the exit side of the primary heat exchanger 6 selectively through the first hydraulic circuit A or the second hydraulic circuit B.

The part of the hydraulic system which is outlined in a dashed manner in FIG. 1 can be integrated into a heating installation, preferably into a compact heating installation 16, wherein all components with the exception of the primary heat exchanger 6 and the secondary heat exchanger 8 can be integrated into a construction unit such as a hydraulic block. Such a heating installation 16 essentially comprises four hydraulic connections, specifically firstly a service water entry 18 and a service water exit 20 as well as for the first hydraulic circuit A, a feed connection 22 and a return connection 24. The heating installation 16 is connected in the known manner to external pipework via these four hydraulic connections 18, 20, 22 and 24.

A switch-over valve which is electrically driven, in order, activated by a control device when heated service water is delivered, to lead the heat transfer medium flow through the secondary heat exchanger 8 and then, when heat is demanded in the room heating circuit, which is to say at the radiator 10, to lead heat transfer medium flow through the first hydraulic circuit A and thus through the radiator or radiators 10, is arranged in known heating installations 16 at the branching point 12 or the branching point 14. According to the invention, one now envisages making do without such a separate electrical drive of a switch-over device or a switch-over valve and effecting the switching-over solely by way of a suitable activation of the circulation pump assembly 2. A control device 26 is provided for this, which for example can be a central control device 26 which also controls the primary heat exchanger 6 in the form of a burner and detects the service water demand via at least one suitable sensor. The control device 26 can be designed as a separate component or for example also be integrated with the control device of the circulation pump assembly 2 into a control device, in particular also completely arranged in the electronics housing 4 of the circulation pump assembly 2. The control device 26 provides the control of the circulation pump assembly 2 with a signal, as to whether a service water heating or a supply of the room heating circuit with the heat-transfer medium is desired. The electronic control of the circulation pump assembly 2 which forms a speed controller then controls the circulation pump assembly 2 such that the flow is selectively led through one of the hydraulic circuits A and/or B via a mechanical switch device in the branching point 12 or the branching point 14. Thereby, the mechanical switch device is coupled to the circulation pump assembly 2 in a purely hydraulic manner via the fluid, which is to say the heat transfer medium which is delivered by the circulation pump assembly 2.

Examples for such switch devices are described hereinafter.

With the described embodiments of the invention, the switch device is designed as a valve with two valve elements, wherein embodiments for the arrangement at the branching point 12 or for the arrangement at the branching point 14 are described.

Figure 2:
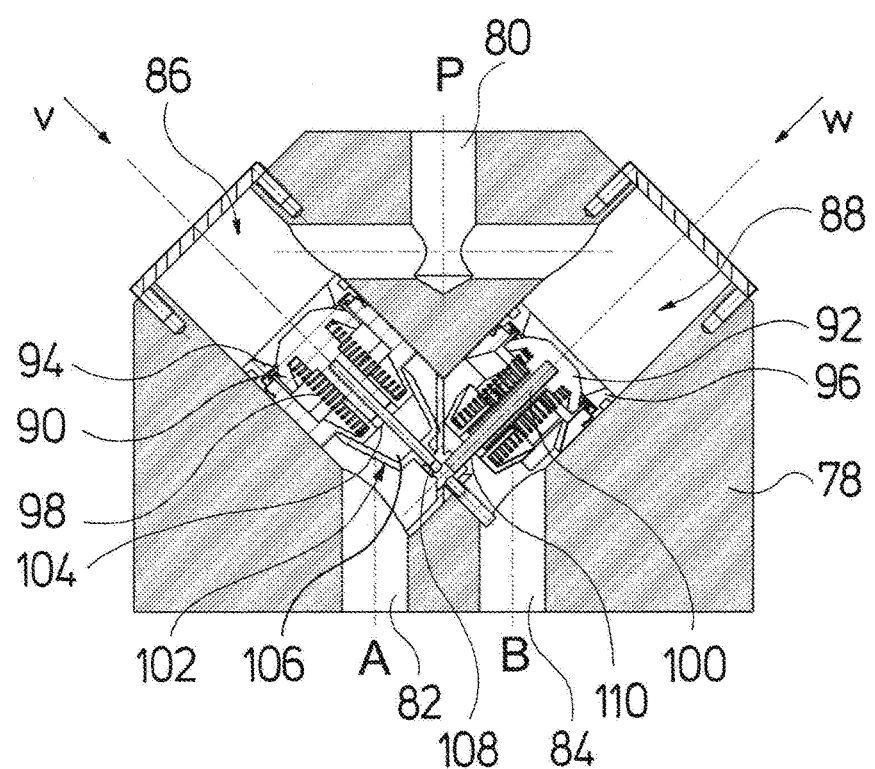
FIG. 2 is a sectioned view of a switch device for a hydraulic system according to the invention, according to a third embodiment.
Figure 3:
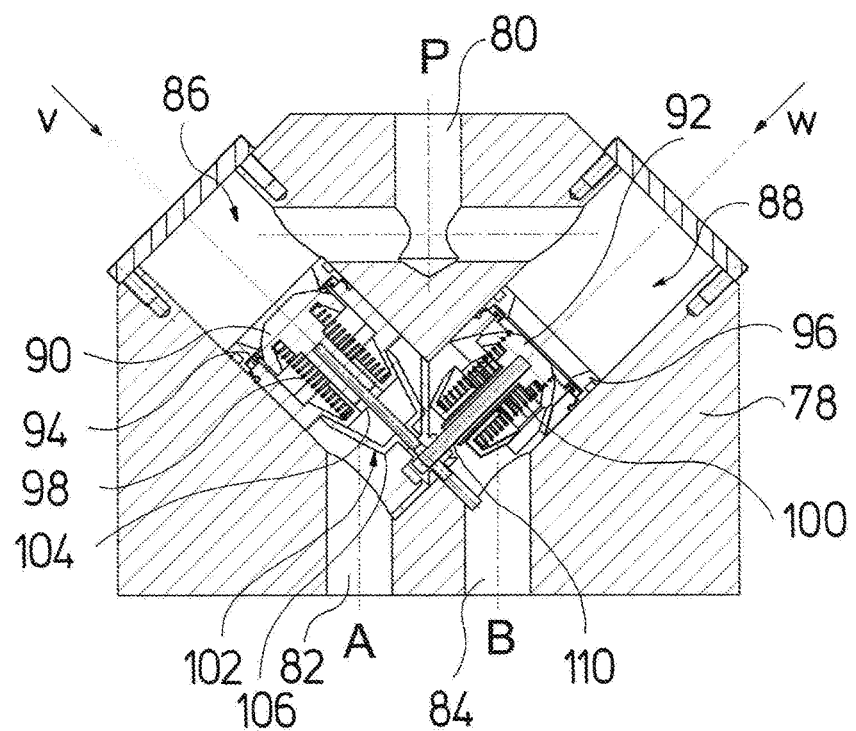
FIG. 3 is a sectioned view of the switch device according to FIG. 2, in a first switch position.
Figure 4:
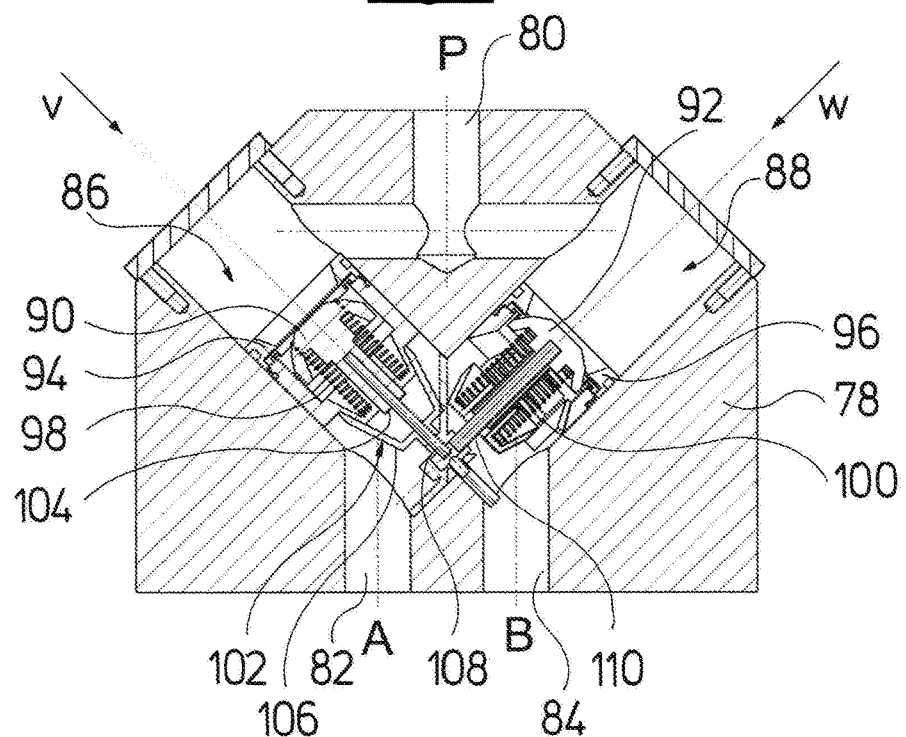
FIG. 4 is a sectioned view of the switch device according to FIG. 2, in a second switch position.

The embodiment of a switch device which is described by way of FIGS. 2-4 is envisaged for the arrangement on the delivery side of the circulation pump assembly 2, which is to say at the branching point 12. Only the pressure loss of the primary heat exchanger 6 acts at this branching point 12, the more significant pressure loss in the hydraulic circuits A and B is however effected between the branching points 12 and 14 through the secondary heat exchanger 8 and the radiators 10.

The switch device comprises a housing in the form of a valve block 78 which comprises a pressure-side connection 80 for connection to the branch P of the hydraulic circuits, which is to say to the exit side of the primary heat exchanger 6. The valve block 78 moreover comprises two exit-side connections 82 and 84, of which the connection 82 is connected to the first hydraulic circuit A which is to say via the feed connection 22 to the radiators 10, and the connection 84 is connected to the second hydraulic circuit B which is to say to the secondary heat exchanger 8.

Two valves 86 and 88 are arranged in the valve block 78. The valves 86 and 88 together form a switch device and are each designed in the manner of check valves. Thereby, the valve 86 lies in the flow path between the connection 80 and the connection 82 for the first hydraulic circuit A and the valve 88 lies in the flow path between the connection 80 and the exit-side connection 84 for the second hydraulic circuit B. Both valves 86, 88 are closed in a first switch position, in the idle position shown in FIG. 2, which is to say that the valve element 90 of the valve 86 bears on the valve seat 94 and the valve element 92 of the valve 88 bears on a corresponding valve seat 96. The valve 86 comprises a compression spring 98 and the valve 88 a compressing spring 100, which produce a biasing force and press the respective valve element 90, 92 into the closed idle position shown in FIG. 2. The compression springs 98 and 100 are differently dimensioned. The first valve 86 has a weaker compression spring 98 than the compression spring 100 of the second valve 88.

Figure 14:
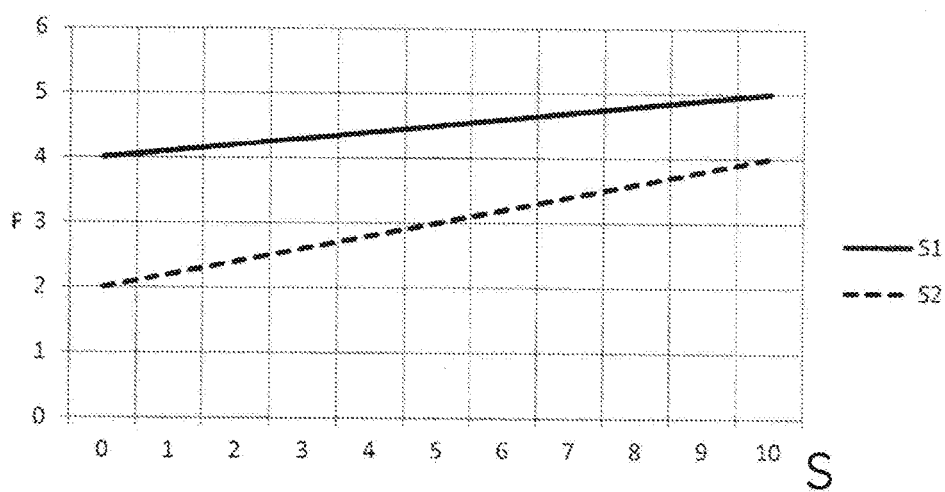
FIG. 14 is a diagram schematically showing the two different spring characteristics of two valves according to FIG. 2-8 as well as 12 and 13.

The different dimensioning of the compression springs 98 and 100 is represented in FIG. 14. FIG. 14 schematically shows a characteristic S1 of the compression spring 100 and the characteristics S2 of the compression spring 98. The force F is plotted over distance S in the diagram according to FIG. 14, wherein the force F in this diagram is not the spring force, but the produced pressure or the produced delivery head of the circulation pump assembly 2 at its delivery side. It is to be recognized that the weaker compression spring 98 produces a lower biasing force than the stronger compression spring 100. In the closed idle position, in which the associated valve element has not yet moved in the opening direction, a delivery head of 2 m is necessary in this example, in order to open the first valve 86, whereas a delivery head of 4 m is necessary, in order to effect an opening procedure of the valve 88 which comprises the stronger compression spring 100. It is simultaneously to be recognized that in this embodiment, the weaker compression spring 98 has a somewhat steeper spring characteristic S2, by which means the delayed movement of the valve 86 or its valve element 90 is encouraged. One can recognize from the diagram according to FIG. 14 that with a slow pressure build-up for example between 2 m and 4 m delivery head, the valve 86 with the weaker compression spring 98 can be opened by way of a movement of the associated valve element 90 into the second switch position, before the valve element 92 of the second valve 88 moves. Thus, the valve element 90 can be firstly moved into a position, in which the opening of the valve element 92 is blocked, before the pressure is increased to such an extent that also the valve element 92 is moved into its opened position, as described below.

The valve 86 is additionally provided with a damping or delay device 102. The delay device 102 has a closed fluid-filled space, into which a cylindrical piston 104 of the valve element 90 immerses with its movement into the opened position. Fluid can escape out delayed of the closed volume of the delay device 102 via an opening 106 functioning as a throttle location, when the piston 104 immerses into the volume. Thus a damping or delay of the movement of the valve element 90 in the opening direction v occurs.

In turn, it is possible by way of variation of the pressure build-up on accelerating the pump assembly 2, to open one of the valves 86 and 88 in a targeted manner by way of the combination of the weaker compression spring 98 with this delay device 102. The valve element 92, since it is not delayed in its movement, will move more quickly into its opening direction w than the valve element 90 which is delayed in its movement by the delay device 102, if a rapid pressure build-up, for example with a steep ramp for the acceleration or an abrupt increase to a high operating pressure is selected. A pressure which is only sufficient to overcome the spring force of the compression spring 98 which is designed more weakly, but is not yet sufficient to move the valve element 92 against the pressure force of the compression spring 100, is firstly reached in the connection 80, if a slower pressure build-up with several steps or with a shallower ramp is selected for the acceleration and the pressure build-up. This means that the valve element 90 will the firstly move in the opening direction v into its opened switch position. The second valve element 92 only then moves against the compression spring 100, if the pressure acting upon the valve element 92 at its face side hydraulically facing the connection 80 is sufficiently large to overcome the counteracting spring force.

The valve elements 90 and 92 are moreover designed such that they are mechanically coupled or mutually block one another. The movement axes or opening directions v and w of the two valve elements 90 and 92 are angled at an angle of 90 to one another and intersect one another. Moreover, the valve element 90 at its axial end which is away from the valve seat 94 comprises a pin-like extension 108 which forms a guide pin. Accordingly, the second valve element 92 at its end which is away from the valve seat 96 comprises a pin-like extension 110 which forms a guide pin. The pin-like extension 108 extends in the direction of the movement axis or opening direction v of the valve element 90. The pin-like extension 110 extends along the longitudinal axis or movement axis or opening direction w of the second valve element 92. The pin-like extensions 108 and 110 are dimensioned such that if the valve element 90 is located in its opened position, its pin-like extension 108 projects into the movement path of the valve element 92, so that its pin-like extension 110 comes to bear on the outer periphery of the pin-like extension 108. This condition is shown in FIG. 4. This prevents the second valve element 92 from also being able to move into its opened position or switch position with a further pressure increase, when the first valve element opens firstly with a slow pressure build-up. This means that even if the pressure in the connection 80, which acts upon the valve element 92 increases to such an extent that the hydraulic force exceeds the force of the compression spring 100, the valve element 92 can no longer move into its opened position. If conversely, the second valve element 92 is opened first of all, then its pin-like extension 110 moves into the movement path of the pin-like extension 108 of the first valve element 90, so that given an opening movement, the pin-like extension 108 of the valve element 90 abuts on the outer periphery of the pin-like extension 110, as is shown in FIG. 3. This means that the first valve element 90 can subsequently no longer move into its opened position or switch position, and a second switch position of the complete valve arrangement is achieved, when the valve element 92 firstly moves into its opened position with a rapid pressure build-up.

Thus with this embodiment too, the switch device can be switched solely by the hydraulic force which acts from the circulation pump assembly 2 onto the delivered fluid or the heat transfer medium. This hydraulic force acts in the form of a pressure upon the control surfaces of the valve elements 90 and 92. The delay of the pressure build-up from the circulation pump assembly 2 up to the valve elements 90 and 92 is equal since the valve elements 90 and 92 both lie at the branching point 12. Despite this, both valves 86 and 88 do not react equally rapidly, since the valve element 90 of the valve 86 is braked in its movement by way of the delay element 102, and thus the valves 86 and 88 have different dynamics.

Figure 5:
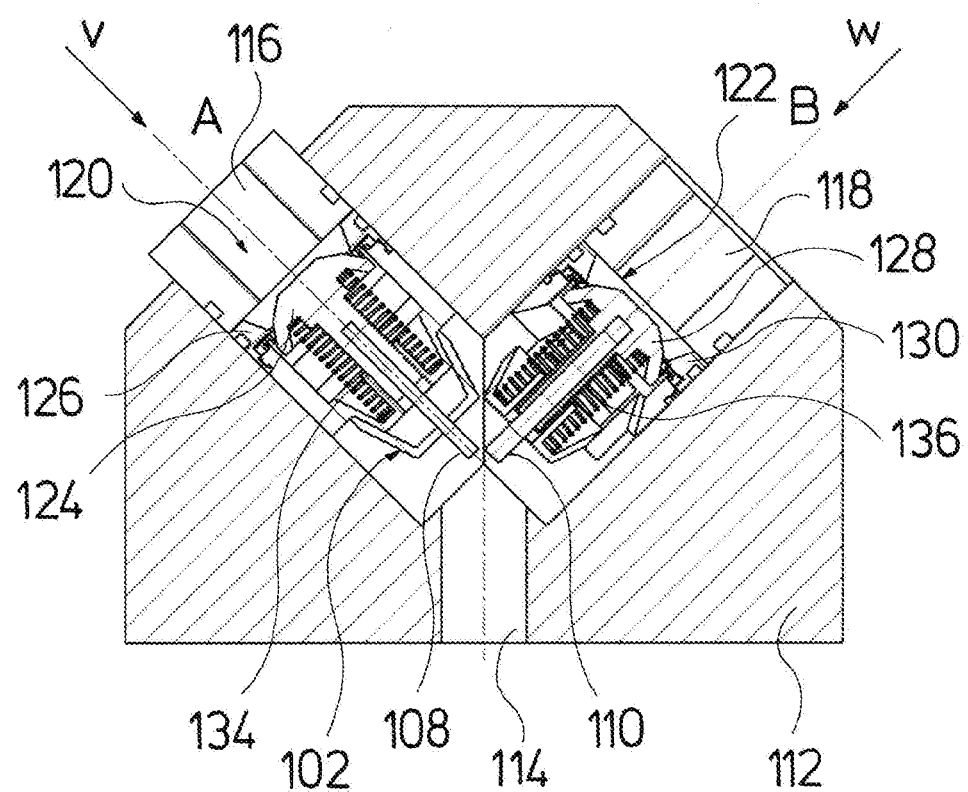
FIG. 5 is a sectioned view of a switch device for a hydraulic system according to the invention, according to a fourth embodiment.
Figure 6:
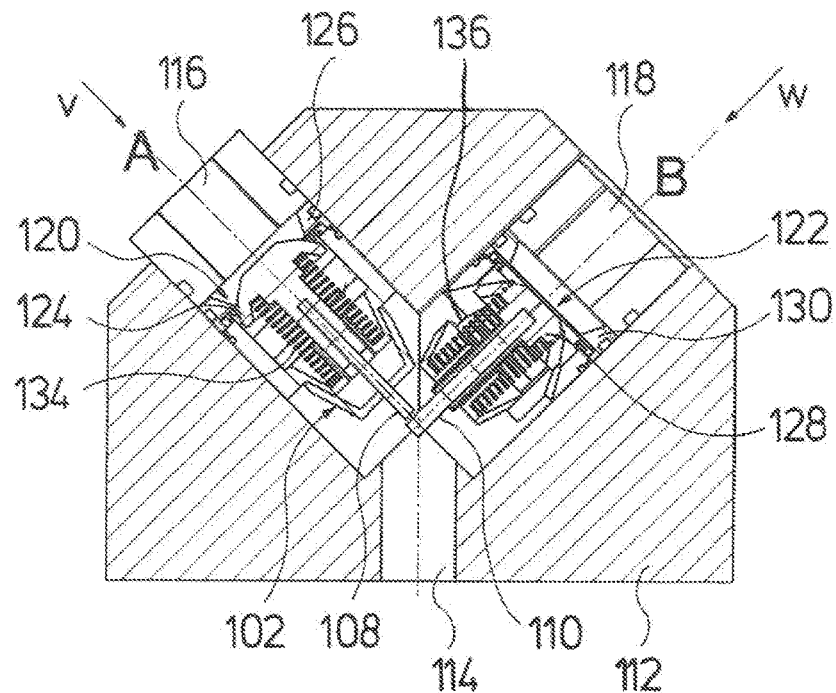
FIG. 6 is a sectioned view of the switch device according to FIG. 5, in a first switch position.
Figure 7:
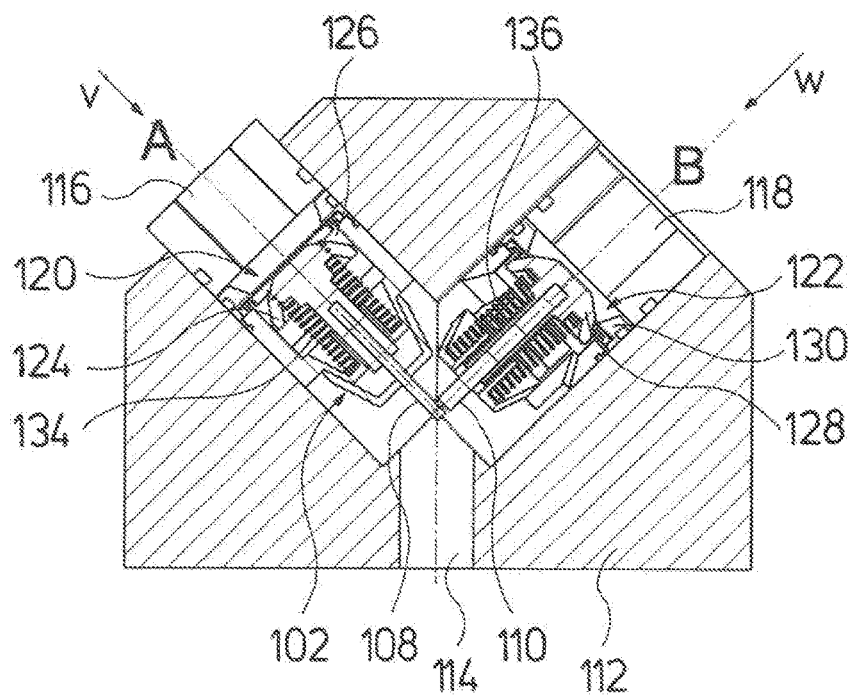
FIG. 7 is a sectioned view of the switch device according to FIG. 5, in a second switch position.

FIGS. 5-7 show a further embodiment example for a switch device similarly to the switch device which has been described by way of FIGS. 3 and 4, with the difference that the switch device according to FIGS. 5-7 is provided for arrangement at the branching point 14, which is to say is provided at the suction side of the circulation pump assembly 2.

With this embodiment, the valve block 112 comprises an outlet 114 which is provided for connection to the suction side of the circulation pump assembly 2. Moreover, two inlets 116 and 118 are present in the valve block, wherein the inlet 116 is connected to the exit side of the hydraulic circuit A and the inlet 118 is connected to the exit side of the hydraulic circuit B. This means that the inlet 116 has a connection to the return connection 24, and the inlet 118 has a connection to the secondary heat exchanger 8, inasmuch as the valve block 112 is applied with the embodiment example according to FIG. 1. A first valve 120 is arranged in the inlet 116 and a second valve 122 is arranged in the inlet 118. FIG. 5 shows the first switch position of the two valves 120, 122 which forms the idle position, wherein with regard to the valve 120, the valve element 124 bears on a valve seat 126. In the second valve 122, a valve element 128 bears on a valve seat 130. Each of the valves comprises a compression spring 136, 134 which press the valve elements 124 and 128 into the closed position shown in FIG. 5. With this embodiment too, the compression spring 134 is designed more weakly than the compression spring 136. I.e. the compression spring 136 has a greater spring constant and/or a greater biasing than the compression spring 134, as explained by way of the previous embodiment. The valve 120 moreover is provided with a delay device 102, as has been described by way of FIGS. 2-4. This description is referred to at this location. The valve elements 124 and 128 also comprise pin-like extensions 108 and 110 as have been described by way of FIGS. 2-4. A uniform pressure force does not act upon the valves 120 and 122 according to FIGS. 5-8, upon the control surfaces on the sides of the valve elements 124 and 128 which face the inlets 116 and 118, in contrast to the embodiment example according to FIGS. 2-4. Instead, a uniform suction force acts via the outlet 114 onto the opposite side of the valve elements 124 and 128. However, with this embodiment example too, a switching of the valves 120 and 122 can be achieved solely via the type of the course of the pressure increase on acceleration of the circulation pump assembly 2, due to the different valve dynamics.

An adequately strong vacuum will quickly build up at the outlet 114 and via the hydraulic circuit B a pressure will build up at the inlet 118 which displaces the valve element 128 against the compression spring 136 in the opening direction w and thus opens the valve 122, if a rapid acceleration with a rapid pressure build-up to a predefined pressure sufficient to overcome the stronger compression spring 136 is selected. The pin-like extension 110 of the valve element 128 simultaneously displaces into the movement path of the valve element 124 and its associated pin-like extension 108. Given an opened valve 122, thus an opening of the valve 120 delayed in its movement is therefore prevented by way of the pin-like extension 108 of the valve element 124 abutting on the pin-like extension 110.

Thus a first switch position of the complete valve arrangement is achieved. The delayed movement of the valve element 124 is effected via the delay device 102. The pressure build-up to the inlet 116 via the first hydraulic circuit A can additionally be effected in a delayed manner, as described above by way of the first embodiment example. With a suitable design, this delay could also be sufficient to the extent that one could make do without the delay device 102 in this embodiment example.

Due to the lower spring force of the compression spring 134, firstly only the valve element 124 will move in the opening direction v as is shown in FIG. 7, if the pressure build-up is effected more slowly or in a stepwise manner, firstly to a pressure which is lower than the pressure which is necessary to displace the valve element 128 against the compression spring 136. I.e. the valve 120 opens first of all. The second valve 122 is then blocked via the pin-like extension 108, so that this valve can no longer open. Thus a second switch position of the valve arrangement formed by the valves 120 and 122 is achieved. The valve elements 124 and 128 are moved via their compression springs 134 and 136 respectively back into the initial position shown in FIG. 5, with the stoppage of the circulation pump assembly and the pressure reduction.

The arrangement of two valves 120 and 122 as has been described by way of FIGS. 5-7 can also be integrated directly into a pump casing 138 of a circulation pump assembly 2. With this arrangement shown in FIG. 8, the exit sides of the two valves 120 and 122 do not run out into a common outlet 114, as shown in FIGS. 5-7, but directly into the suction chamber 140 in the inside of the pump casing 138. The receiver for the valves 120 and 122 can thus be designed as one piece with the pump casing 138. Such a design in particular is suitable for being integrated directly into a compact heating installation, in particular into the hydraulic block of such a compact heating installation. Thus the inlet 116 can directly form the return connection 24 for the room heating circuit, and the inlet 118 can be directly connected to the secondary heat exchanger 8.

Figure 8:
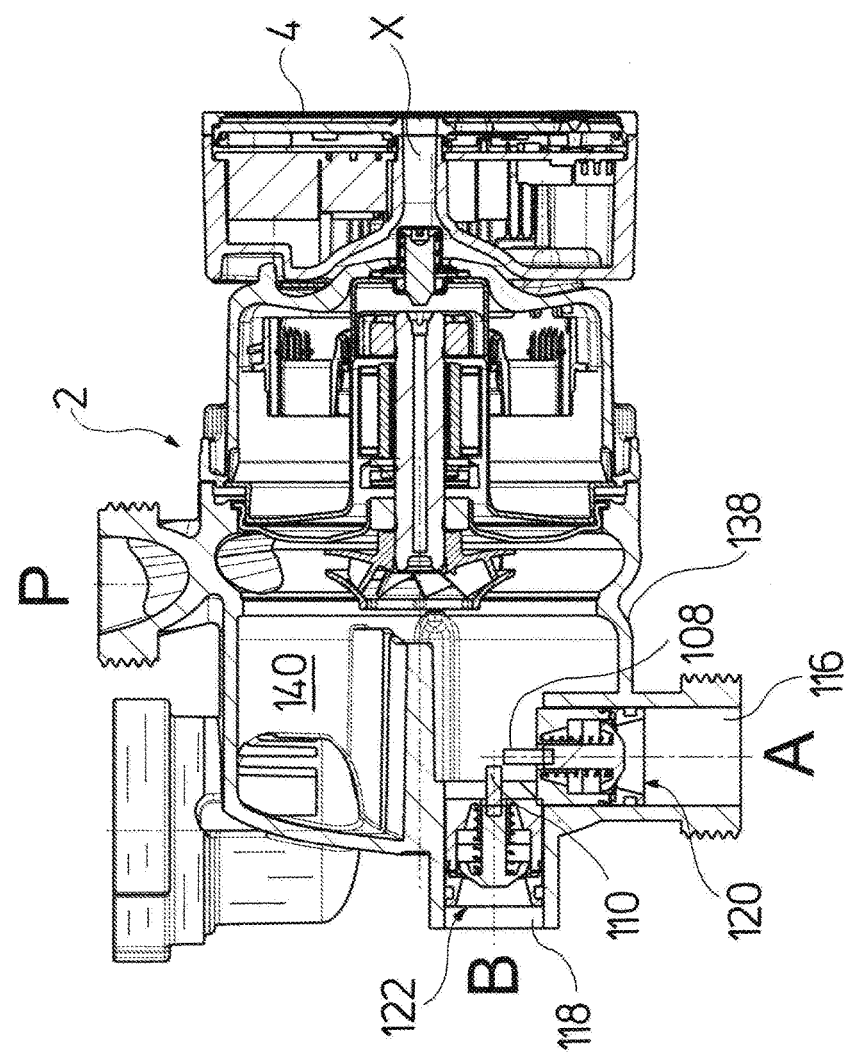
FIG. 8 is a sectioned view of a pump assembly with an integrated switch device according to a fifth embodiment of the invention.
Figure 9:
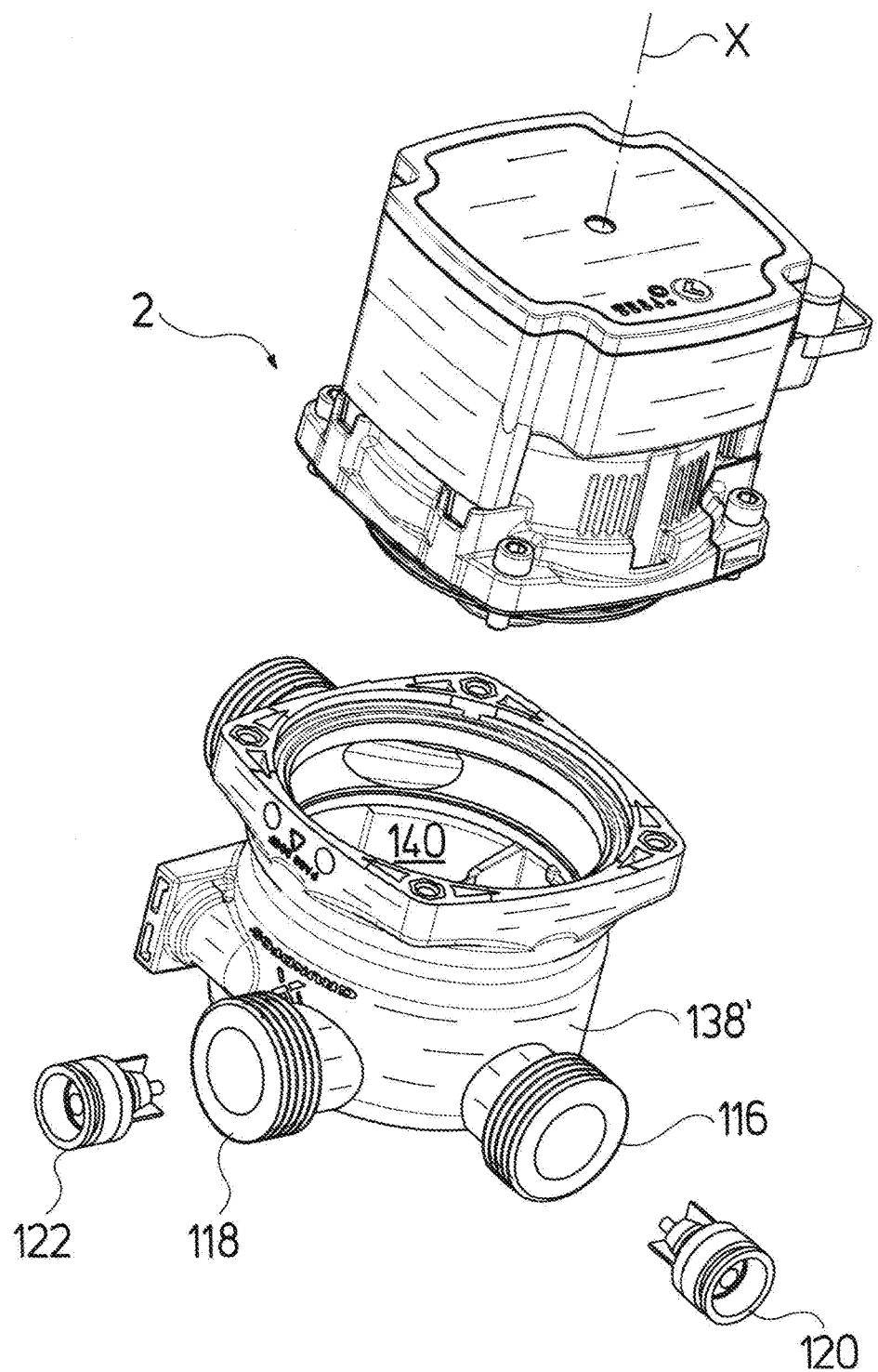
FIG. 9 is an exploded view of a circulation pump assembly with an integrated switch device according to a sixth embodiment of the invention.
Figure 10:
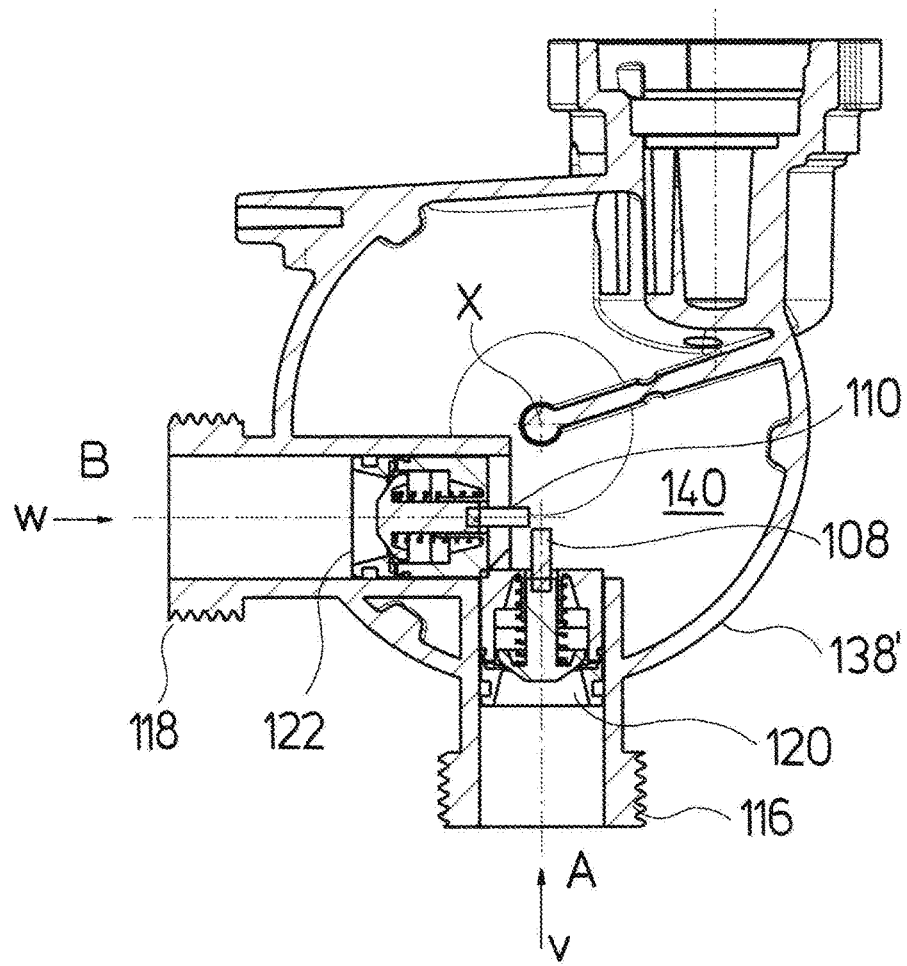
FIG. 10 is a sectioned view of the pump casing according to FIG. 9.

FIGS. 9 and 10 show an alternative design to the arrangement according to FIG. 8, and this differs from the arrangement shown in FIG. 8 only in that the inlet 118 is not directed to the rear side in a direction parallel to the rotation axis X of the circulation pump assembly, but laterally at an angle of 90 to the inlet 116, so that both inlets 116 and 118 are directed at right angles to one another and at right angles to the rotation axis X of the circulation pump assembly. Such an arrangement, compared to the arrangement shown in FIG. 8 can be for example advantageous if a secondary heat exchanger 8 is not to be applied onto the pump casing 138' at the rear side, but laterally.

The preceding description with regard to FIGS. 2-7 is referred to with regard to the manner of functioning of the valves 120 and 122 which form the switch device, with the embodiments according to FIGS. 8-10.

Figure 15:
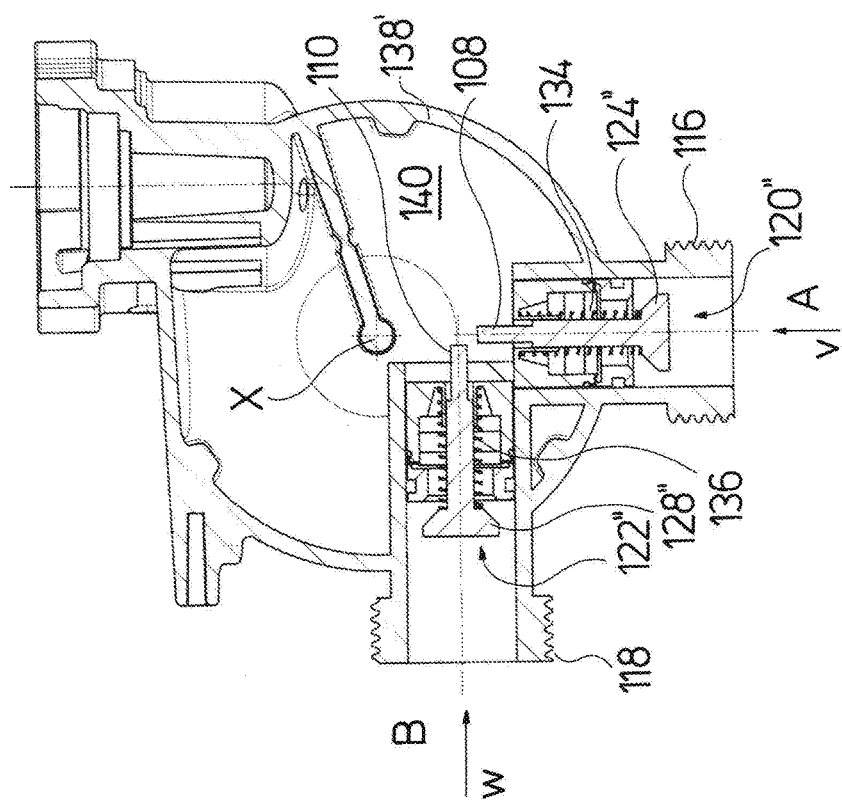
FIG. 15 is a sectioned view of an alternative design to the design according to FIG. 10.

In the previous embodiment examples, the valves 86, 88, 120, 120' and 122 are designed such that they are closed in their first switch position forming the idle position, and are moved in a targeted manner into an opened second switch position by way of the occurring hydraulic forces. However, it is to be understood that the valves can also be designed in the reverse manner and be opened in their first switch position forming the idle position. The valves can then be moved in a targeted manner into a second closed switch position by the occurring hydraulic forces which are created by the circulation pump assembly. Such an embodiment example is shown in FIG. 15, which represents an alternative embodiment to the embodiment shown in FIG. 10. With the embodiment according to FIG. 15, valves 120" and 122" with valve elements 124" and 128" are shown, instead of the valves 120 and 122, and these elements are held in their first switch position which in this case is an opened switch position, in each case by way of compression springs 134 and 136, in the previously described manner. The valve elements 122" and 124", according to the previously description, can be brought in a targeted manner into a second switch position, in which they are closed, by way of a suitable activation of the circulation pump assembly 2, on account of the different biasing forces and different dynamic characteristics. Thereby, the pin-like extensions 108 and 110 as previously described effect a mutual blocking of the valves 120" and 122". The functioning manner of the valves 120" and 122" thereby corresponds to the previously described manner of functioning of the valves 120 and 122. The single difference lies in the fact that the valve elements 124" and 128" in the example shown in FIG. 15 are moved from an opened into a closed position instead of from a closed into an opened position.

Figure 12:
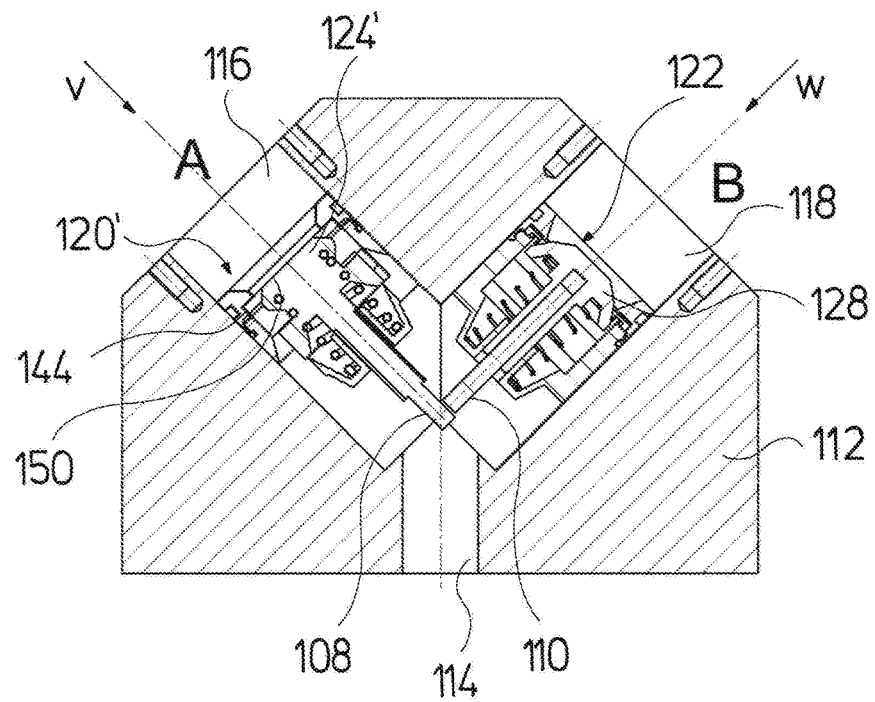
FIG. 12 is a sectioned view of a valve block with the valve according to FIG. 11, in a first switch position.
Figure 13:
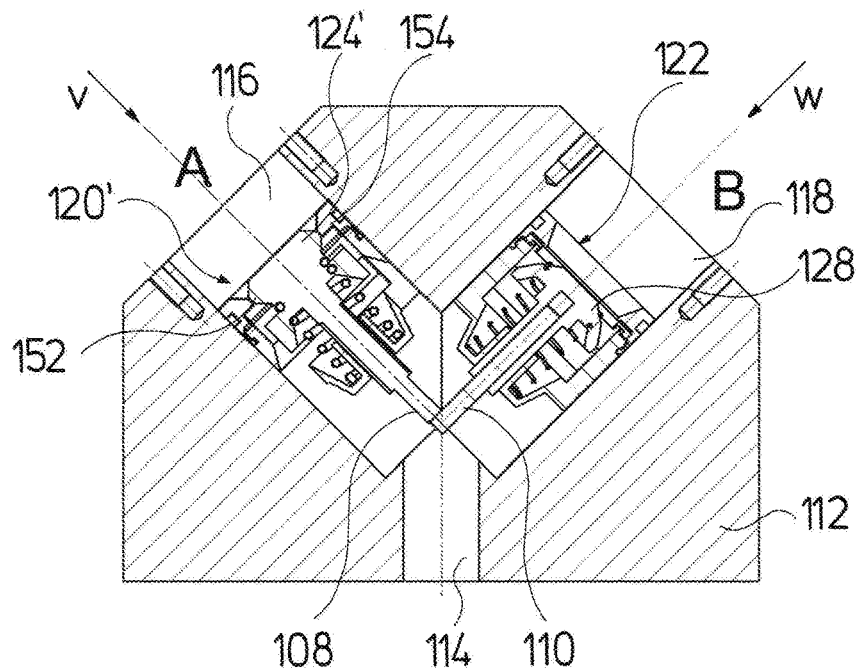
FIG. 13 is a sectioned view of the valve block according to FIG. 12 in a second switch position.

FIGS. 12 and 13 show an alternative arrangement of two valves corresponding to the valves 120 and 122 as have been described by way of FIGS. 5-10. The valve 122 which releases or closes the flow path to the second hydraulic circuit B thereby corresponds to that of the preceding description. The valve 120' which releases or closes the flow path to the first hydraulic circuit A, with regard to its damping function or delay function is designed differently than in the embodiment examples according to FIGS. 5-10.

Figure 11:
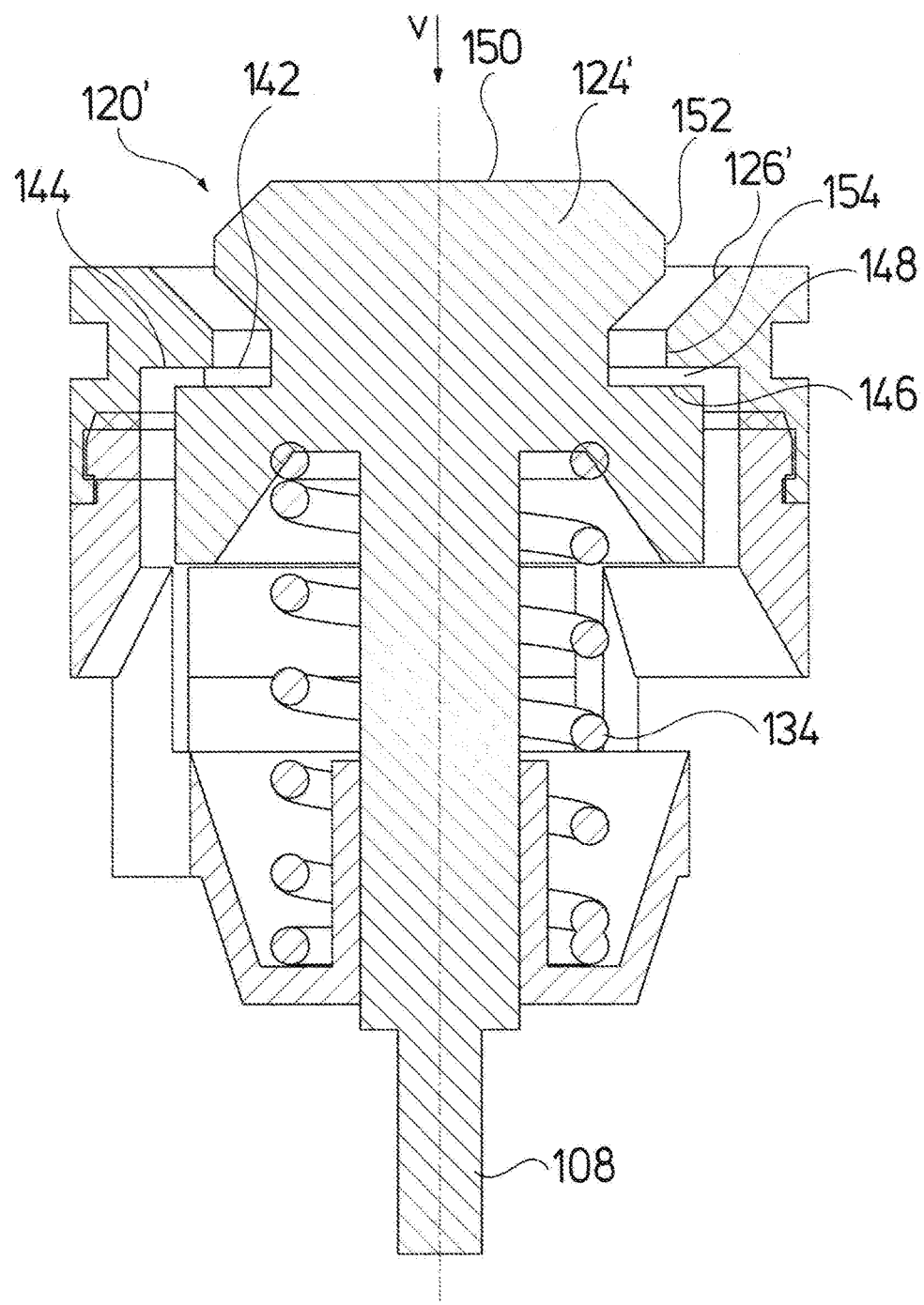
FIG. 11 is a sectioned view of a valve with a delay device.

The construction of the valve 120' is shown in an enlarged manner in a sectioned view in FIG. 11. The valve 120' differs from the valve 120 in the construction of the valve element 124' and of the valve seat 126'. FIG. 11 shows the closed switch position of the valve 120'. In this switch position, the valve element 124' bears via a projection 142 on an inner side of the valve seat 126'. The inner side 144 is away from the inlet 116. The projection 142 is situated on a radially outwardly projecting shoulder 146 of the valve element 124'. The projection 142 has the effect that the valve 120' is not completely closed in this first position, but rather a radially outwardly directed annular gap 148 is formed between the shoulder 146 and the inner side 144 of the valve seat 126'. A radially outwardly directed flow is effected through this annular gap 148, and this flow according to Bernoulli's law effects a force opposite to the opening direction v, onto the valve element 124' at the shoulder 46. This force is thus directed in the same direction as the spring force of the compression spring 134. The fluid pressure acts upon the face side 150 of the valve element 124', wherein the face side 150 represents a control surface. The hydraulic force which acts upon the control surface 150 is greater than the force of the compression spring 134 and the axial force arising in the annular gap 148 if the fluid pressure is large enough, so that the valve element 124' is moved in the opening direction. Thereby, the gap width of the annular gap 148 enlarges so that the hydraulic force which is on the shoulder 146 and which is directed oppositely to the opening force is reduced.

An annular surface 152 on the outer periphery of the valve element 124' close to its face side 150 moves into the region of the inner periphery 154 of the valve seat 126' during the continued movement of the valve element 124' in the opening direction v. The annular surface 152 has a diameter which is the same or slightly smaller than the inner diameter of the inner periphery 154. The valve 120' is essentially closed when the annular surface 152 lies opposite the inner periphery 154 of the valve seat 126'. This closed position is shown in FIG. 13. The valve 122 in this position is already opened due to the rapid pressure build-up, as described above, and then via its pin-like extension 110 blocks a further opening of the valve 120' as described above. This is the first switch position of the switch device. The valve element 124' moves further in the opening direction v if the continued movement is not blocked by the pin-like extension 110 of the valve element 128, wherein the annular surface 152 passes the inner periphery 154 of the valve seat 126', so that a gap is formed between the inner side 144 and the face side 150 of the valve element 124', as is shown in FIG. 12, and thus the valve 120' is in its opened second position. As described above, in this position, the pin-like extension 108 of the valve element 124' blocks the valve element 128 in its movement, so that this cannot move into its opened position. Via the valve 120', the first hydraulic circuit A is then opened in this second switch position, whereas the second hydraulic circuit B is closed.

Although the switching of the valves is effected by way of different speed increases concerning the previously described examples, it is to be understood that the valves can also be designed in a corresponding manner such that they are switched by way of differently rapid speed reductions.

While specific embodiments of the invention have been shown and described in detail to illustrate the application of the principles of the invention, it will be understood that the invention may be embodied otherwise without departing from such principles.

The invention claimed is:

1. A hydraulic system comprising:
   at least one circulation pump assembly provided with a speed controller;
   at least one hydraulic circuit connected to the circulation pump assembly;
   at least one mechanical switch device which is subjected to pressure from a fluid in the hydraulic circuit and which can be moved into at least two different switch positions, wherein the at least one mechanical switch device can be moved by the circulation pump assembly by way of a hydraulic coupling via the fluid, and the speed controller is configured to initiate a movement of the switch device by way of at least one hydraulic force acting upon the switch device and causing a movement of the switch device via the hydraulic circuit, via a speed adaptation of the circulation pump assembly;
   another hydraulic circuit wherein the circulation pump assembly is connected to at least two hydraulic circuits and the at least one mechanical switch device is configured as at least one valve with at least two movable valve elements for changing a ratio of flows through the at least two hydraulic circuits, the at least one valve comprising at least one first and a second control surface, upon which a fluid pressure produced by the circulation pump assembly acts, wherein the first control surface is connected to the first valve element and the second control surface is connected to the second valve element such that the valve elements are movable by way of the forces acting upon the first and second control surface, the two valve elements having different dynamic characteristics such that the valve elements react differently to different pressure changes in the system.

2. A hydraulic system according to claim 1, wherein the mechanical switch device is configured such that the mechanical switch device reacts to pressure changes due to a speed change of the circulation pump assembly, such that the mechanical switch device can be selectively moved into one of the switch positions in dependence on the pressure or a change of the pressure.

3. A hydraulic system according to claim 1, wherein the mechanical switch device is configured such that the mechanical switch device reacts to differences in a course of a pressure build-up or pressure reduction of the fluid given a speed change of the circulation pump assembly, such that the switch device moves into a first switch position given a speed change of the circulation pump assembly with a first course of the pressure build-up, and into a second switch position given a speed change of the circulation pump assembly with a second course of the pressure build-up or pressure reduction which is different to this first course.

4. A hydraulic system according to claim 1, wherein the mechanical switch device is configured to be self-holding, such that the mechanical switch device remains in an assumed switch position up to a predefined speed change of the circulation pump assembly.

5. A hydraulic system according to claim 1, wherein the speed controller is configured such that at least two different speed courses of the circulation pump assembly can be set by the speed controller, wherein the speed controller is configured such that the circulation pump assembly permits speed changes with at least two different acceleration courses.

6. A hydraulic system according to claim 1, wherein the switch device is configured such that the movements into the at least two different switch positions are effected with different temporal delays, wherein the movements are effected along differently long paths and/or counter to differently large damping, inertia forces and/or biasing forces.

7. A hydraulic system according to claim 1, wherein the switch device is situated at an entry side of the hydraulic circuits.

8. A hydraulic system according to claim 1, wherein the switch device is arranged at the delivery side of the circulation pump assembly.

9. A hydraulic system according to claim 1, wherein the mechanical switch device is arranged on a suction side of the circulation pump assembly.

10. A hydraulic system according to claim 1, wherein the mechanical switch device is situated downstream of a first heat exchanger in the hydraulic system.

11. A hydraulic system according to claim 1, wherein the switch device is additionally subjected to gravitational force, to at least one magnet force and/or to at least one spring force, which acts in a direction of at least one movement axis of the switch device.

12. A hydraulic system according to claim 11, wherein the gravitational force, the magnet force and/or the spring force is directed opposite to a hydraulic force which acts upon the switch device and which is produced by the circulation pump assembly.

13. A hydraulic system according to claim 1, wherein the switch device is additionally subjected to gravitational force, to at least one magnet force and/or to at least one spring force, which acts in a direction of at least one movement axis of the switch device and in the idle position, each valve element is held in a defined first switch position by the gravitational force, the magnet force and/or the spring force, and the valve elements as well as the gravitational force, the magnet force and/or the spring force are configured such that one of the valve elements is moved by way of the fluid pressure firstly into a second switch position, in dependence on the course of the speed change of the circulation pump assembly.

14. A hydraulic system according to claim 1, wherein the first and the second valve element in their movement direction between the switch positions have differently large travels, are differently greatly damped and/or have inertia forces, friction forces and/or biasing forces which are counter to this movement direction and are differently large.

15. A hydraulic system according to claim 14, wherein at least one of the valve elements is provided with a delay device, wherein the delay device is configured such that fluid which flows through the valve along this valve element effects the delay.

16. A hydraulic system according to claim 15, wherein the delay device has a valve gap which extends transversely to a movement axis of the valve element between the valve element and a valve seat and which can be changed in gap width by way of a movement of the valve element along the movement axis.

17. A hydraulic system according to claim 16, wherein the valve gap is closed in one switch position.

18. A hydraulic system according to claim 1, wherein at least one valve with one of the valve elements is configured such that the valve element with movement along a movement axis, departing from a first switch position firstly closes by a certain amount and thereupon opens further.

19. A hydraulic system according to claim 1, wherein the first and the second valve element are coupled such that always only one valve element can be located in an opened switch position or always only one valve element can be located in a closed switch position.

20. A hydraulic system according to claim 19, wherein the movement axes of the first and of the second valve element run angled to one another.

21. A hydraulic system according to claim 19, wherein the movement axes of the first valve element and of the second valve element are perpendicular to one another.

22. A hydraulic system according to claim 1, wherein the hydraulic system is configured as a hydraulic heating and/or cooling system, wherein of the at least two hydraulic circuits, a first hydraulic circuit runs through an object to be temperature-controlled and a second hydraulic circuit runs through a secondary heat exchanger for the temperature control of service water.

23. A hydraulic system according to claim 22, wherein the switch device comprises a first valve element in the first hydraulic circuit running through the object to be temperature-controlled, and a second valve element in the second hydraulic circuit running through the secondary heat exchanger, wherein the first valve element in a first movement direction is biased with a lower force than the second valve element, and in an opposite movement direction the first valve element is more greatly damped or delayed in movement than the second valve element.

24. A hydraulic system according to claim 1, wherein the circulation pump assembly and the at least one switch device are arranged in a common construction unit comprising an integrated hydraulic construction unit for a compact heating installation.

25. A hydraulic system according to claim 22, wherein a valve element of the switch device in the first hydraulic circuit has a perpendicular movement axis, and a valve element in the second hydraulic circuit has a horizontal movement axis, wherein the horizontal movement axis extends parallel to a rotation axis of the circulation pump assembly.

26. A hydraulic system according to claim 1, wherein the first valve element comprises a first valve element spring having a first valve element spring constant, the second valve element comprising a second valve element spring having a second valve element spring constant, wherein one of the first valve element spring constant and the second valve element spring constant is less than another one of the first valve element spring constant and the second valve element spring constant.

27. A hydraulic system according to claim 1, wherein the first valve element and the second valve element are movable relative to each other.

\* \* \* \* \*